US012179139B2

(12) United States Patent
Santander Kuborn

(10) Patent No.: US 12,179,139 B2
(45) Date of Patent: Dec. 31, 2024

(54) SYSTEM AND METHOD, TO EXTRACT WATER FROM THE ENVIRONMENT AND REGULATE TEMPERATURE WITH LOW ENERGY USE USING A THERMAL HEAT EXCHANGE CASCADE

(71) Applicant: ENERGY INNOVATION SYSTEMS LIMITED, Hong Kong (CN)

(72) Inventor: Jean Baptiste Claudio Santander Kuborn, Lo Barnechea (CL)

(73) Assignee: ENERGY INNOVATION SYSTEMS LIMITED, Central Hong Kong (CN)

( * ) Notice: Subject to any disclaimer, the term of this patent is extended or adjusted under 35 U.S.C. 154(b) by 325 days.

(21) Appl. No.: 17/764,119

(22) PCT Filed: Oct. 2, 2020

(86) PCT No.: PCT/EP2020/077712
§ 371 (c)(1),
(2) Date: Mar. 25, 2022

(87) PCT Pub. No.: WO2021/064202
PCT Pub. Date: Apr. 8, 2021

(65) Prior Publication Data
US 2022/0401852 A1    Dec. 22, 2022

Related U.S. Application Data

(60) Provisional application No. 62/910,207, filed on Oct. 3, 2019.

(51) Int. Cl.
*F25B 23/00* (2006.01)
*B01D 5/00* (2006.01)

(52) U.S. Cl.
CPC ........... *B01D 5/0006* (2013.01); *B01D 5/009* (2013.01); *F25B 23/00* (2013.01)

(58) Field of Classification Search
CPC ...... B01D 5/0006; F25B 23/00; F25B 25/005; F24F 5/0021; F24F 2003/1452; F24F 2003/1446
See application file for complete search history.

(56) References Cited

U.S. PATENT DOCUMENTS 6,170,271 B1 * 1/2001 Sullivan .................. F24F 3/153
62/93
8,875,526 B1 * 11/2014 Isaacson ................. F24F 3/153
62/272

(Continued)

*Primary Examiner* — David J Teitelbaum
(74) *Attorney, Agent, or Firm* — Ferguson Case Orr Paterson LLP

(57) ABSTRACT

A system to extract water from the environment and control temperature through heat transfer between two or more environments, with low energy consumption, for domestic, commercial, or industrial use, which comprises: at least one force unit (10), capable of increasing or decreasing the pressure of the thermal working fluid, wherein the force unit (10) comprises one cylinder (1), which comprises within at least one plunger (2) joined to a piston (27), wherein the piston (27) moves alternately through the activation of a directional control valve (29) that receives hydraulic fluid from a hydraulic pump (32); at least one closed chamber connected to the cylinder (1), wherein that closed chamber comprises at least one tube (12) joined with at least one closed radiator (8*a*, 8*b*) wherein thermal working fluid is compressed inside that closed chamber, wherein the change from liquid to solid state or vice versa occurs, or from solid to another solid state or vice versa; and a control unit (11) that regulates the operation of the directional control valve (29) according to the temperature and pressure obtained from the closed chamber; a first (92) and a second (93) heat transfer circuit, wherein the valves (37*as*, 37*ai*, 37*bs*, 37*bi*; 81*ai*, 81*bs*, 81*bi*; 81*as*, 81*ai*, 81*bs*, 81bi) are operated by a control unit (11) and associated method.

20 Claims, 10 Drawing Sheets

(56) References Cited

U.S. PATENT DOCUMENTS

| | | | |
|---|---|---|---|
| 2005/0066668 A1* | 3/2005 | Barnwell | F28D 7/103 |
| | | | 62/93 |
| 2015/0089971 A1* | 4/2015 | Furui | F25D 16/00 |
| | | | 62/434 |
| 2015/0159889 A1* | 6/2015 | Ha | F24F 3/153 |
| | | | 62/126 |
| 2017/0051950 A1* | 2/2017 | Uselton | F25B 40/02 |
| 2019/0351739 A1* | 11/2019 | Kim | B60H 1/32281 |
| 2019/0353361 A1* | 11/2019 | Attari | F24F 11/65 |
| 2019/0353409 A1* | 11/2019 | Warner | F25B 1/10 |

* cited by examiner

| Presion [bar] | $T_{in}$ [°C] | $\Delta T$ [°C] | Calor [KJ] | COP |
|---|---|---|---|---|
| 170 | 20.9 | 0.42 | 125.97 ± 3.67 | 14.93 ± 0.44 |
| 180 | 20.3 | 0.30 | 124.59 ± 3.55 | 16.18 ± 0.46 |
| 190 | 20.9 | 0.24 | 133.79 ± 3.82 | 16.90 ± 0.48 |
| 190 | 23.5 | 0.45 | 124.91 ± 3.51 | 18.15 ± 0.51 |
| 200 | 21.5 | 0.39 | 134.25 ± 3.91 | 18.22 ± 0.53 |
| 210 | 22.3 | 0.38 | 97.66 ± 2.85 | 12.69 ± 0.37 |
| 210 | 26.7 | 0.48 | 75.22 ± 2.25 | 9.46 ± 0.28 |
| 220 | 21.4 | 0.41 | 132.20 ± 3.85 | 14.22 ± 0.41 |
| 220 | 21.7 | 0.45 | 154.39 ± 4.50 | 20.26 ± 0.59 |
| 220 | 23.9 | 0.48 | 76.84 ± 2170 | 10.22 ± 2.89 |
| 220 | 23.9 | 0.46 | 119.33 ± 3.49 | 13.78 ± 0.40 |
| 240 | 23.7 | 0.50 | 142.50 ± 4.08 | 16.33 ± 0.47 |
| 240 | 26.1 | 0.51 | 114.16 ± 3.34 | 13.46 ± 0.39 |
| 250 | 25.4 | 0.66 | 148.62 ± 4.34 | 14.16 ± 0.41 |
| 250 | 25.5 | 0.48 | 147.92 ± 4.23 | 13.26 ± 0.38 |

Fig. 11

SYSTEM AND METHOD, TO EXTRACT WATER FROM THE ENVIRONMENT AND REGULATE TEMPERATURE WITH LOW ENERGY USE USING A THERMAL HEAT EXCHANGE CASCADE

FIELD OF THE INVENTION

This invention is related to the temperature control and environmental humidity extraction industry. In particular, this invention is related to a system and method to control air temperature and extract moisture from the environment through the recirculation of fluids between chambers, which equalize the temperatures in an intermediate step between compression and decompression, thus achieving the efficient use of a pre-charge of pressure and the latent heat of compressed fluids in that method, with a coefficient of performance (COP) over 10, even over 20, wherein the coefficient of performance (COP) is an expression of efficiency of a heat pump, which compares the output of condensed heat (Q) with an absolute value, with respect to the power provided to the compressor (W), meaning that COP=|Q|/W. Wherein this system and method efficiently uses the latent heat use of the compressed liquid inside a closed chamber contained in a radiator, which in turn has the role of transferring heat to another fluid, thus heating and/or cooling other radiators, to generate heat transfer and with it, the condensation of the water contained in the air. The fluid in the closed chamber is sensitive to the change of temperature outside that chamber, wherein that fluid changes state when it absorbs or surrenders heat, and with that obtains water through air saturation which provokes the condensation of water contained in the air; therefore, water is extracted per $m^3$ of air as a result of heat transfer. It can therefore be used in domestic, commercial, or industrial settings.

Furthermore, with this method and system, in a preferably cascade configuration, two or more thermal working fluids are used which correspond to phase change materials known as PCM, or Phase Change Material, which have different fusion/solidification temperatures at the same pressure, thus allowing the system to work with a single thermal working fluid or PCM inserted into closed chambers comprised by a tube (12) and some radiators (8a, 8b), wherein the first chamber has a PCM with lower fusion temperature with respect to the fluid in the second chamber, at the same pressure.

STATE OF THE ART

Currently, in the state of the art related to water recovery from the environment, several solutions have been found that partially solve the technical problem raised. Within what is known is the publication of patent application US2007256430A, which refers to water extraction from the air and desalination; in short, it refers to a water maker that extracts water from the air through adiabatic compression and heats the air, wherein, the heated air cools through a backflow heat exchange so it is left oversaturated and the water condenses. Then, the air cools even further and passes through the heat exchanger again to recover its heat. Then it passes through the adiabatic expander to recover energy. In addition, a single isothermal compressor/expander can be used to isothermally compress the humid air, so the air oversaturates with water and the water condenses. Then, the air cools to the water condensation heat and returns to the isothermal compressor/expander to recover energy. In addition, this device extracts humidity in the air through a backflow heat exchanger to cool its dew point to collect water. Then, the air cools adiabatically and returns through the backflow heat exchanger and a compressor, which compresses the air to ambient pressure and discharges it.

In addition, application PCT/CL2018/050156 is published, which is a heat transfer method and system with its patent in process, which has various efficiency losses produced by lost energy in the system as a result of the change of temperature in the circuits of this closed cylinder/valve system or similar, in which its closed chamber contained a fluid sensitive to temperature change outside that chamber, wherein that fluid changes states when its absorbs or surrenders heat.

Within the differences in the state of the art, especially regarding improvements to application PCT/CL2018/050156, one is that this technology has a cascade system and method as shown in FIGS. 4 and 5, which helps to make the system operate with two or more thermal working fluids that have their fusion/solidification temperature at atmospheric pressure at different temperatures, which makes it possible, through this system, to make this system and method work with only one thermal working fluid in, hereinafter PCM, inserted into the radiators (8A, 8B) or with both PCM.

Furthermore, a hybrid system is incorporated, which includes lowering air temperature through humidification, air which enters a heat exchanger (42) (to favor low energy consumption) and then, this heated air enters a third heat exchanger (87) which will cool, saturate the air, and condense the water contained, thus extracting grams of water per $m^3$ of air which shall be delivered to the humidifier or a mesh (96) to restart the process. The air that exits the third heat exchanger (87) will pass through a fourth heat exchanger (88) which will heat it to be sent into the environment.

This application PCT/CL2018/050156 does not disclose the use of a circuit with a fluid that passes through the circuits that contain a thermal working fluid whose goal is to match the circuit temperatures and with this diminish the efficiency curve slope (FIG. 8). These improvements are greatly beneficial for the mentioned system, since before (application PCT/CL2018/050156) a 10° C. temperature difference could have an approximate efficiency loss of 50% to 80% merely by diminishing again the temperature of the circuit which was surrendering heat and will absorb heat. The system and method described herein uses a recirculation subsystem which greatly improves the results, wherein this subsystem, formed by valves (37as, 37ai, 37bs, 37bi; 81ai, 81bs, 81bi; 81as, 81ai, 81bs, 81bi) called low specific heat, increases and improves the method of application PCT/CL2018/050156 The improvements of this technology regarding application PCT/CL2018/050156 manage to diminish the over 50% loss to a 20% loss regarding the ideal COP curve represented in the upper curve of FIG. 8 using this technology; these loss percentages are assessed with a temperature difference of 10° C. between one phase change heat exchanger (34a) and another chamber phase change heat exchanger (34b).

In addition to the efficiency advantages mentioned before regarding application PCT/CL2018/050156, this technology captures water from the environment through air condensation as a result of heat transfer, at a temperature of 26° C. and 95% ambient humidity it loses efficiency or diminishes the COP compression coefficient around 64% (FIG. 8) from having to diminish the temperature of the circuit that was surrendering heat to the minimum desired temperature again, before diminishing the pressure to produce absorption, which is equal to having a 262 kwh/m³ consumption according to the psychrometric diagram (FIG. 9). With the improvement of the method and system, this consumption could decrease to under 130 kwh/m³ of water extracted from the air, which makes this one of the most efficient energy consumption systems worldwide to produce water from the air. The XPRIZE contest (www.xprize.org/prizes/water-abundance) is an example, which in 2017 sought to extract water from the air with a disruptive cost of 20 USD/m³ of water, which is equal to 200 kwh/m³ of water consumption, considering an energy cost of 100 USD/MWH.

Another difference is that the new cascade method and system (FIGS. 4 and 5) can make the device work with two or more thermal working fluids that have different temperatures for change of state at atmospheric pressure, which may be fusion/solidification at atmospheric pressure. This system can make the device function with only one thermal working fluid, hereinafter PCM, inserted into closed chambers comprised of a tube (12) and some radiators (8a, 8b), or with both PCM and, because of how the circuits which contain water fluids or similar (92), (93), and (C93) are arranged, which connect the heat exchangers (34) that contain the radiators (8a, 8b) that are a part of the closed chambers, fluids (92) and (93) which are controlled with the valves (67), which makes a big difference with regard to the rest of the cascade systems that are currently known.

To this a hybrid system is added that includes lowering air temperature through the humidification that enters an exchanger (42). Afterwards, this heated air enters a third heat exchanger (87) which will cool it; therefore, the air is saturated and the water contained is condensed, thus extracting grams of water per m³ of air which will be delivered to the humidifier (96) to restart the process. The air that comes out of the third heat exchanger (87) will pass through the other heat exchanger (88) which will heat it to be expelled into the environment. This hybrid system, represented in FIG. 6, is an AC cooling system and an AWG water extractor system, which will be different from the other current systems in that it will use low energy consumption to extract water from the air, to use this extracted water to humidify and/or deliver water for consumption, with a more complete system because it will be able to cool or heat an environment, fulfill the role of extracting water, through another heat exchanger (87), and humidify the air that passes through a heat exchanger (42), which produces a temperature decrease of the air that passes through this exchanger (42), therefore lowering the workload of the force unit (10) of the respective heat exchanger (42), even working in free cooling, no compression mode, and in the same moment it saturates the air that comes out of the heat exchanger through another heat exchanger (87), thus extracting water contained in the air. Being able to extract water and accumulate it when the environmental conditions (humidity and temperature) are suitable for use in a later stage, and thus favor better device performance, transforms this device into something unique with multiple operating and purpose options, always with low energy consumption. It is also environmentally friendly because it does not use coolants with a Global Warming Power ("GWP") over 0 and it does not depend on the requirement of water from external sources. With current technologies, without using this invention, extracting water from the air through a heat exchanger that surrenders heat or a condenser would have very high energy consumption, thus making it impossible to maintain today's energy efficiency standards.

Therefore, none of these documents presents a system and method to extract water from the environment and control temperature through heat transfer between two or more environments, with low energy consumption, for domestic, commercial, or industrial use, since none of them use the specific heat of two or more thermal working fluids that correspond to phase change materials known as PCM to use the delivered or surrendered heat due to the compression or expansion of those thermal working fluids (PCM). Due to the foregoing, the state of the art does not achieve the efficiency of this system and method.

Solution to the Technical Problem

To solve the proposed problem, a system and method to extract water from the environment and control temperature through heat transfer between two or more environments is presented, with low energy consumption, for domestic, commercial, or industrial use, through the efficient use of the specific heat of two or more thermal working fluids, delivered or surrendered due to the compression or expansion of those thermal working fluids (PCM).

DESCRIPTION OF THE FIGURES

FIG. 11, a table with the performance coefficient of the system's discharge process, for a specific PCM, based on a biodegradable oil.

DESCRIPTION OF THE INVENTION

Figure 1:
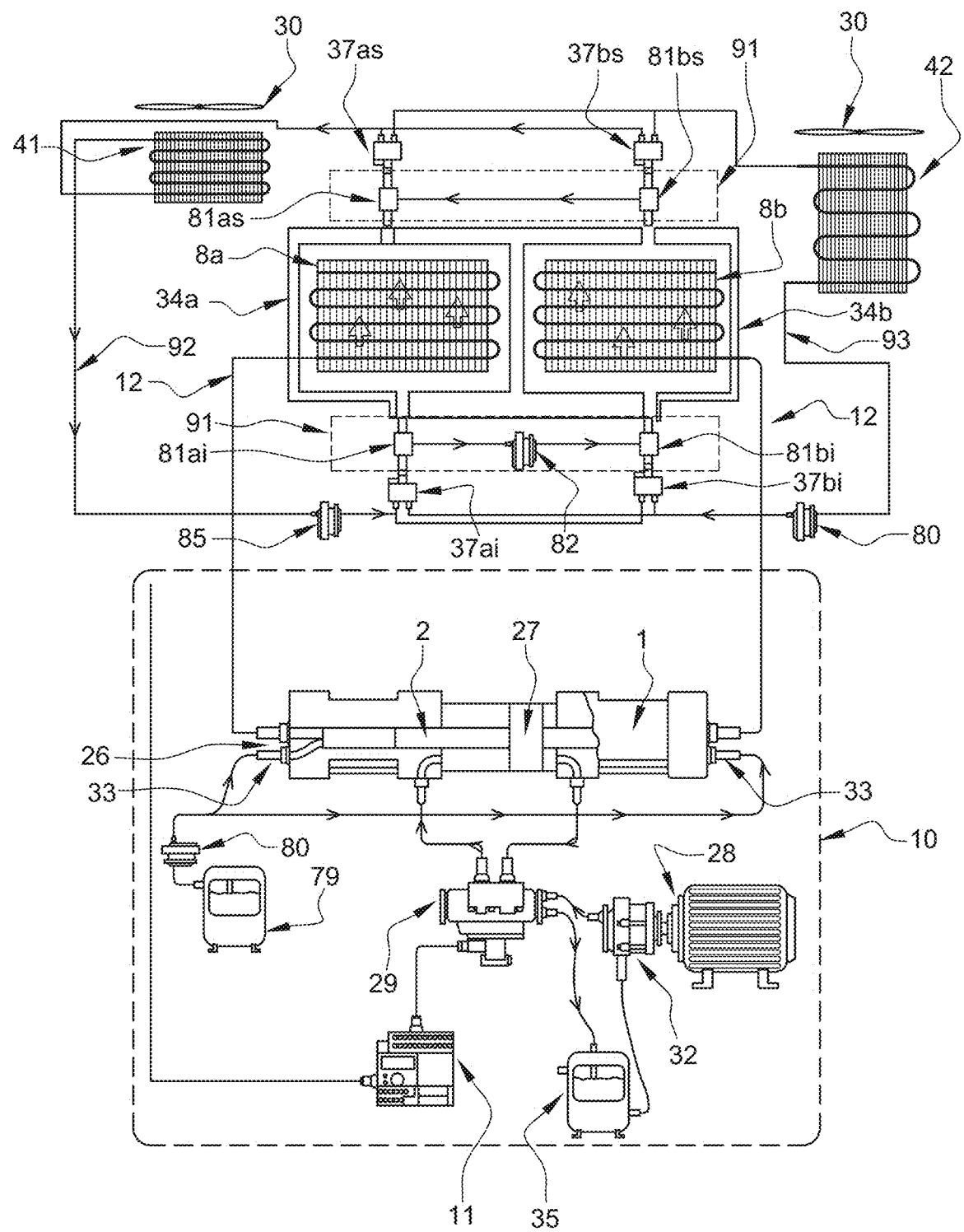
FIG. 1 shows the cooling or heating system.

The system and method to extract water from the environment via temperature control through heat transfer between two or more environments is based on joining two or more exchangers (34) through a closed circuit with an inserted fluid which will mix the fluids contained in the outside of the radiators (8a, 8b) or similar, part of the closed chambers, which are within this exchanger (34), equalizing the temperatures of both radiators (8a, 8b) and the fluid inserted within (which can be a PCM); this is due to the circulation of the heat transfer fluid through both heat exchangers (34) (which can be a mix of water with glycol), through valves (81), part of the low specific heat system. This process will be carried out after both radiators (8a, 8b), part of two closed chambers, have surrendered the heat.

Therefore, while one set of radiators (8a, 8b), part of a closed chamber, surrendered heat, the other set of radiators (8a, 8b), part of another closed chamber, was absorbing heat. After equalizing the temperatures of each exchanger (34), it will be connected to a circuit (92) or (93). If the radiators (8a, 8b) surrender heat, the exchanger (34) that contains these tubes will be connected to a circuit that contains a hotter heat transfer fluid (93). If the radiators (8a, 8b) absorb heat, the exchanger (34) that contains these tubes will be connected to a circuit that contains the colder heat transfer fluid (92), and the steps will thus be repeated.

Figure 4:
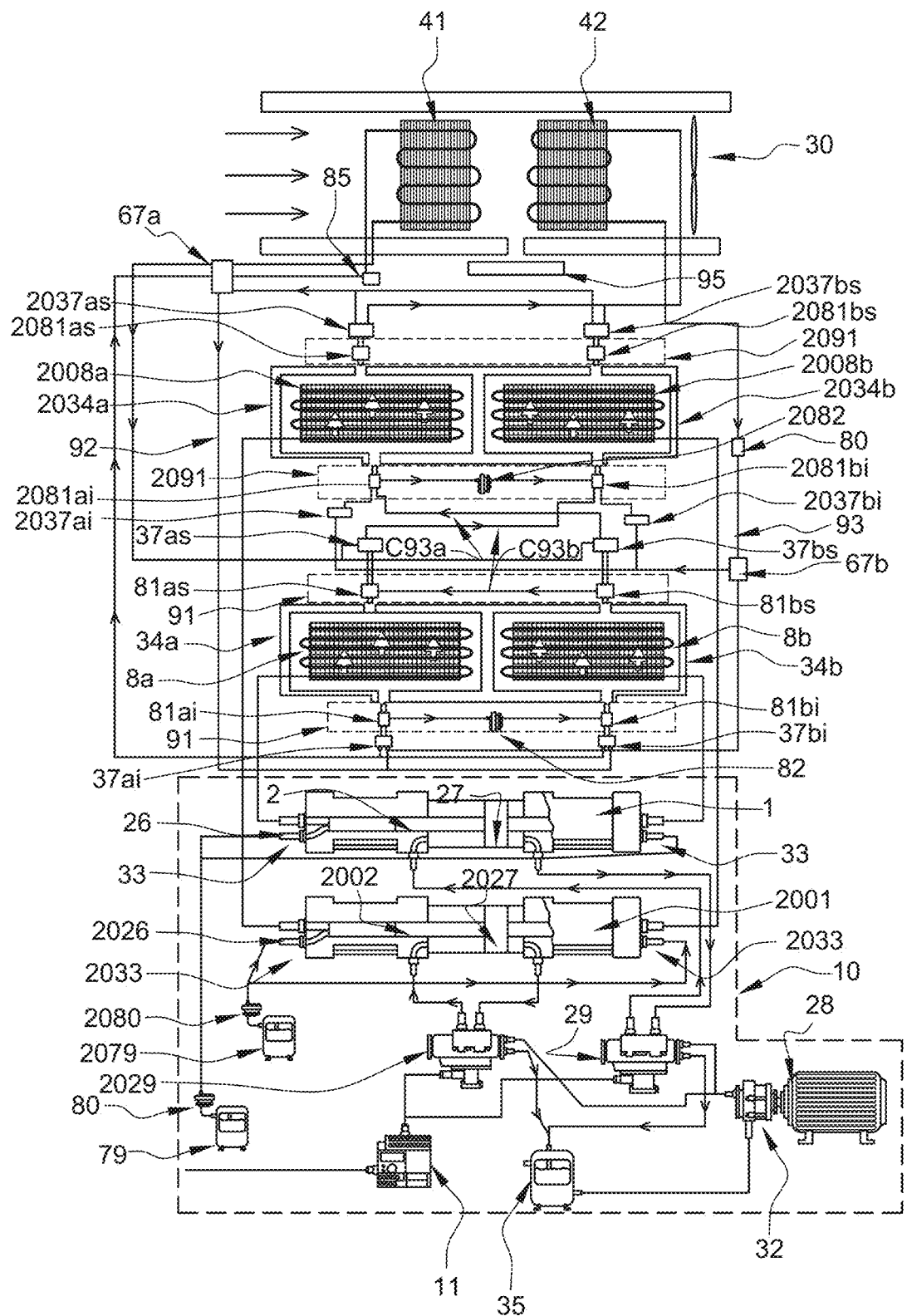
FIG. 4 shows the water extraction system in cascade or in parallel.

One of the preferred configurations of this invention is using a hybrid system, which comprises a humidifier, a second heat exchanger (42), a third heat exchanger (87) which will cool and saturate the air until it triggers the water condensation to use it again or store it for future use and heat the air that comes out of this third heat exchanger (87) through a fourth heat exchanger (88) to lower its workload, part of the water extraction equipment mentioned in the examples, in addition to this system named low specific heat (91) or sensitive heat temperature mixture system, which will be fundamental to activating or deactivating it as appropriate. In addition to regulating the cascade system with the valves (67) so this system works with one or two linear intensifier pumps or something similar (FIG. 4). Besides using this obtained water for the same system, it can be extracted for human, animal, or vegetable use, either directly or through a water treatment process, such as filtering.

Less pressure than the atmospheric pressure can be applied to or pressure can be removed from the circuit to achieve the changes of state at a lower temperature than the solidification temperature or the temperature of change of state from solid to solid, or from solid to liquid and vice versa, or from the changes of state mentioned above of a determined fluid at atmospheric pressure.

The density of the thermal working fluid can also be modified when entering or extracting a determined quantity of this fluid to change the pressure or base pressure of the thermal working fluid through one or more fill valves (33). This can be done prior to the start of a compression-mixture cycle of chamber temperatures (low specific heat) (91)-decompression. This will produce a thermal working fluid that will be at a pressure pushing one face of the piston or plunger or similar; therefore, when the thermal working fluid compresses the opposite side will be supporting or helping move the piston or plunger or similar to increase pressure. As an example, when both chambers connected to a cylinder that has a plunger or piston, or linear intensifier pump (1), have 60 Mpa of pressure, when increasing the pressure of the inserted fluid in one of these closed chambers to 120 Mpa, the inserted fluid in the other closed chamber will lower its pressure from 60 to 0 Mpa. However, since t is always pushing a face of the piston or plunger, this pressure, though minor, will cause force or work W that will support the force unit (1) that can be a hydraulic pump, which will result in lower energy consumption. This entire process will be carried out with the control unit (11).

The control unit (11) can also control the intake and extraction of thermal working fluid so the thermal working fluid pressure does not reach a 0 Mpa pressure, since if it is necessary to absorb heat to a higher temperature than the present temperature, the minimum pressure will increase, there will still be a push effect, but in the case mentioned before, for example, when the minimum absorption temperature increases, the higher pressure could stay at 120 Mpa, but the lower pressure could reach 50 Mpa, for example. For this to happen, the control system will have to insert thermal working fluid so the inserted fluids in both closed chambers have an 85 Mpa pressure prior to the compression-mixture of temperature cycle of chambers (low specific heat)-decompression.

This pressure will also depend on how much the density of the fluid varies when changing states since, when changing states, it changes density. Therefore, the pressure is lowered when heat is surrendered (except in some specific cases like ice Ih, among others), and, therefore, case by case, depending on the type of fluid to be used, the determined values will have to be arranged to adjust the base pressure considering these parameters. This procedure will result in savings for the system.

As shown in FIG. 1, a system is presented to extract water from the environment and control temperature through heat transfer between two or more environments, with low energy consumption, for domestic, commercial, or industrial use, which comprises:

a) at least one force unit (10), capable of increasing or decreasing thermal working fluid pressure, wherein the force unit (10) comprises: a cylinder (1), which comprises inside at least one plunger (2) which is joined to a piston (27), wherein the piston (27) moves alternately through the activation of a directional control valve (29) that receives the hydraulic fluid from a hydraulic pump (32);

b) at least on closed chamber connected to the cylinder (1), wherein that closed chamber comprises:
at least one tube (12) joined with
at least one closed radiator (8a, 8b) wherein the thermal working fluid is compressed within that closed chamber, wherein the change from liquid to solid state or vice versa occurs, or from a solid state to another solid state or vice versa; and c) a control unit (11), which regulates the operation of the directional control valve (29) according to the temperature and pressure obtained from the closed chamber;

d) a first heat transfer circuit (92) which comprises:
a valve (37ia) that is joined to a valve (81ia) at the intake, at least one phase change heat exchanger (34a) that comprises a radiator (8a) on its first side;
at the exhaust of the phase change heat exchanger (34a), a valve (81sa) is joined which is then joined to a valve (37sa), to then connect to a first heat exchanger (41), from which a valve (37ia) connection comes out to close the first heat transfer circuit (92).

e) a second heat transfer circuit (93) which comprises:
a valve (37ib) joined to a valve (81ib) at the intake, at least one phase change heat exchanger (34b) that comprises a radiator (8b) on its second side;
at the exhaust of the phase change heat exchanger (34b), a valve (81sb) is joined, which is then joined to a valve (37sb), to then connect to a second heat exchanger (42), from which a valve (37ib) connection comes out to close the second heat transfer circuit (93), wherein the valves (37as, 37ai, 37bs, 37bi; 81ai, 81bs, 81bi; 81as, 81ai, 81bs, 81bi) are operated by the control unit (11).

Figure 2:
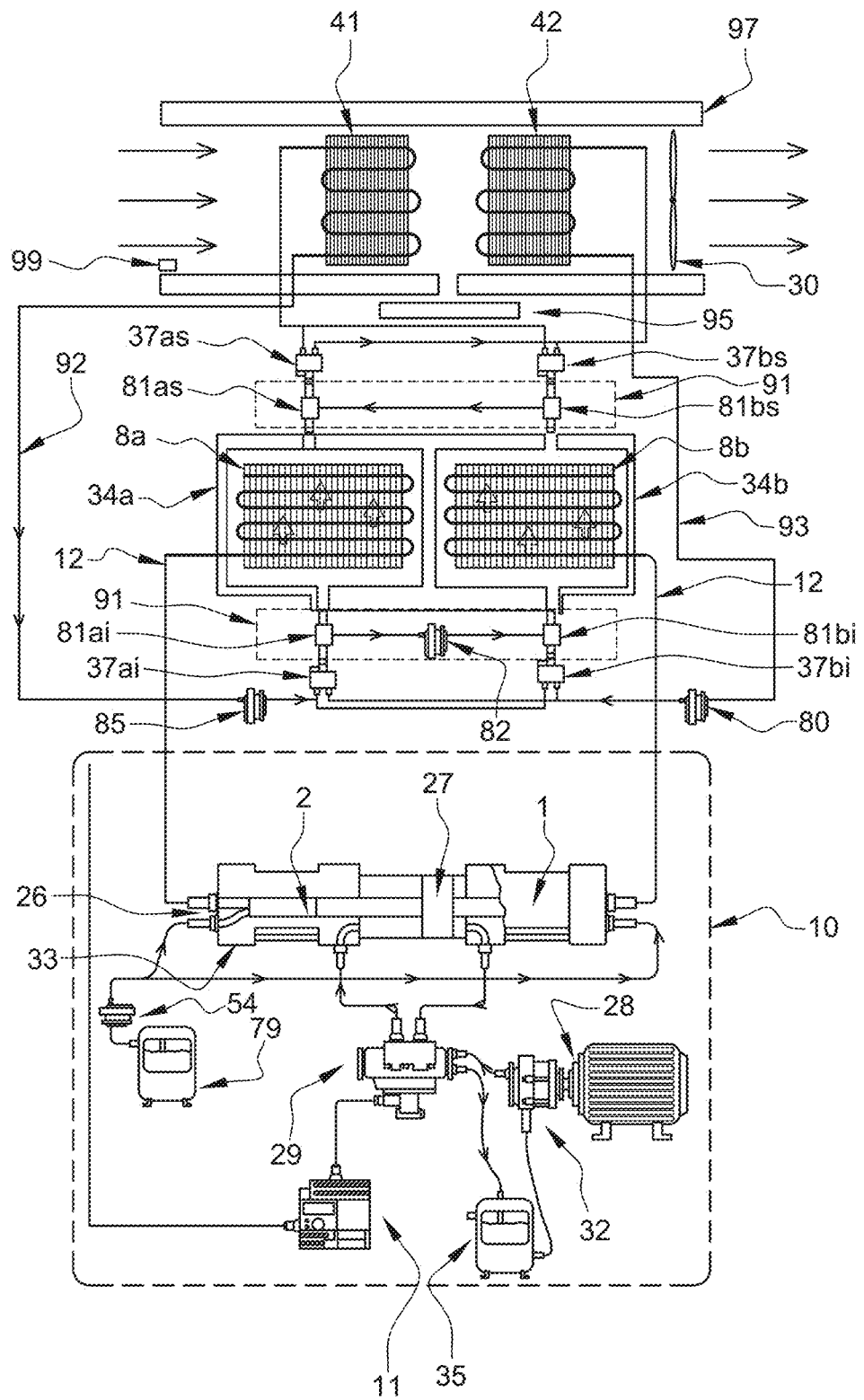
FIG. 2 shows the water extraction system.

In a preferred configuration, as shown in FIG. 2, the system also comprises that the first heat exchanger (41) is before the second heat exchanger (42) within a same pipe (97), with respect to air flow, wherein, between the first heat exchanger (41) and the second (42) there is a water accumulator (95).

Figure 3:
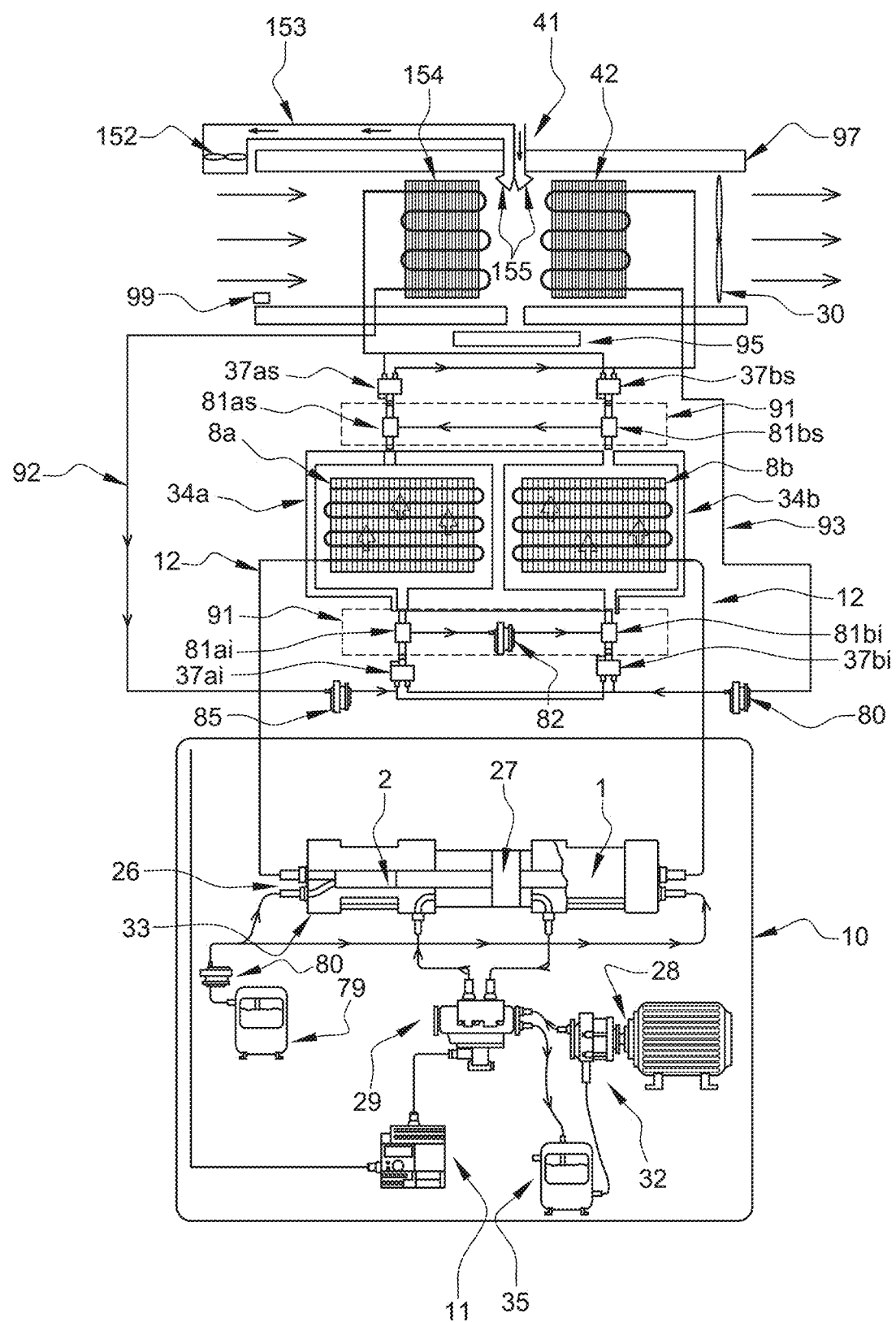
FIG. 3 shows the water extraction system with recirculation pipe.

In another preferred configuration, as shown in FIG. 3, the system also comprises: an air recirculation subsystem (153) which comprises a fan (152) within an air pipe so the air comes in and out of the pipe (97), through some diffusers (155), which are located downstream from the first heat exchanger (41).

In another preferred configuration, as shown in FIG. 4, the force unit (10) also comprises a second cylinder (2001), which inside comprises at least one plunger (2002) joined to a piston (2027), wherein the piston (2027) alternately moves through the activation of a directional control valve (2029), which receives a hydraulic fluid from a hydraulic pump (32);

herein, the first and second heat transfer circuit (92, 93) connect in series to another first and second heat transfer circuit (92, 93) through selector valves of a heat exchanger (67A, 67B), wherein another first and second heat transfer circuit (92, 93) are connected to the first and second heat exchanger (41, 42), and wherein:
a) the other first heat transfer circuit (92) that comprises.
a valve (2037ia) which joins a valve (2081ia) at the intake, at least one phase change heat exchanger (2034) which comprises a radiator (2008a) on its first side;
at the exhaust of the phase change heat exchanger (2034), it is joined to a valve (2081sa) that is joined to a valve (2037sa) to then connect to a first heat exchanger (41), from which a valve (2031ia) connection comes out to close the other first heat transfer circuit (92), and
b) the other second heat transfer circuit (93) that comprises:
a valve (2037ib) that is joined to a valve (2081ib) at the intake, at least one phase change heat exchanger (2034) that comprises a radiator (2008b) on its second side;
at the exhaust of the phase change heat exchanger (2034), a valve is joined (2081sb) that is joined to a valve (2037sb) to then connect to a second heat exchanger (42), from which a valve (37ib) connection comes out to close the other second heat transfer circuit (93).

Figure 5:
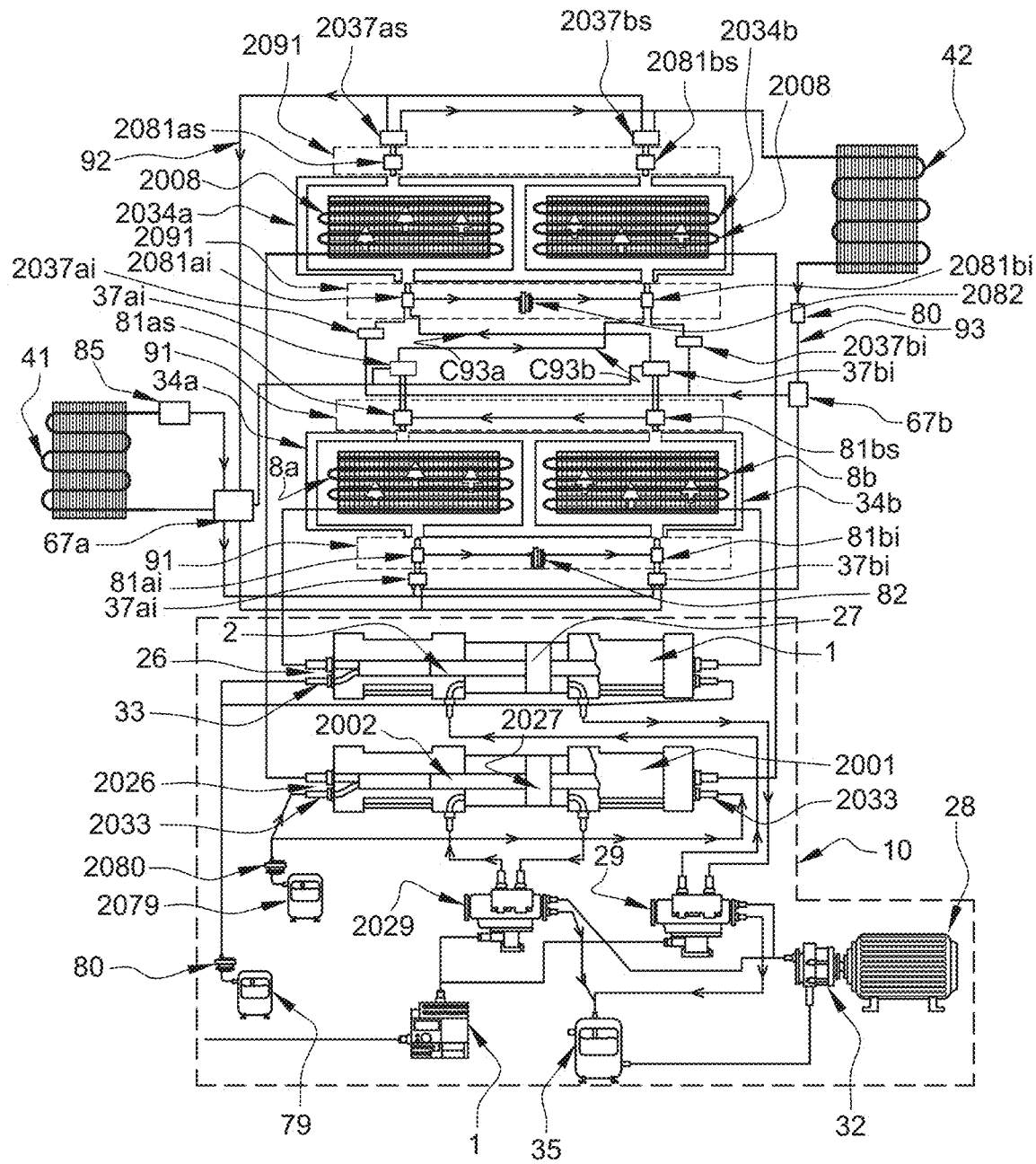
FIG. 5 shows the cooling or heating system with cascade or parallel operation.

In another preferred configuration, as shown in FIG. 5, the force unit (10) also comprises a second cylinder (2001), which inside comprises at least one plunger (2002) that is joined to a piston (2027), wherein the piston (2027) moves alternately through the activation of a directional control valve (2029) which receives a hydraulic fluid from a hydraulic pump (32),
wherein, the first and second heat transfer circuit (92, 93) are connected in series to another first and second heat transfer circuit (92, 93), wherein the other first and second heat transfer circuit (92, 93) are connected to the first and second heat exchanger (41, 42), and wherein:
a) the other first heat transfer circuit (92) that comprises:
a valve (2037ai) is joined to a valve (2081ai) at the intake, at least one phase change heat exchanger (2034) that comprises a radiator (2008a) on its first side;
at the exhaust of the phase change heat exchanger (2034), a valve is joined (2081as) that is joined to a valve (2037as) to then connect to a first heat exchanger (41), from which a valve (2037ai) connection comes out to close the other first heat transfer circuit (92), and b) the other second heat transfer circuit (93) that comprises:
a valve (2037bi) is joined to a valve (2081bi) at the intake, at least one phase change heat exchanger (2034) that comprises a radiator (2008b) on its second side;
is at the exhaust of the phase change heat exchanger (2034), a valve is joined (2081bs) that is joined to a valve (2037bs) to then connect to the other second heat exchanger (42), from which a valve (37bi) connection comes out to close the other second heat transfer circuit (93), forming a subsystem (2000).

Figure 6:
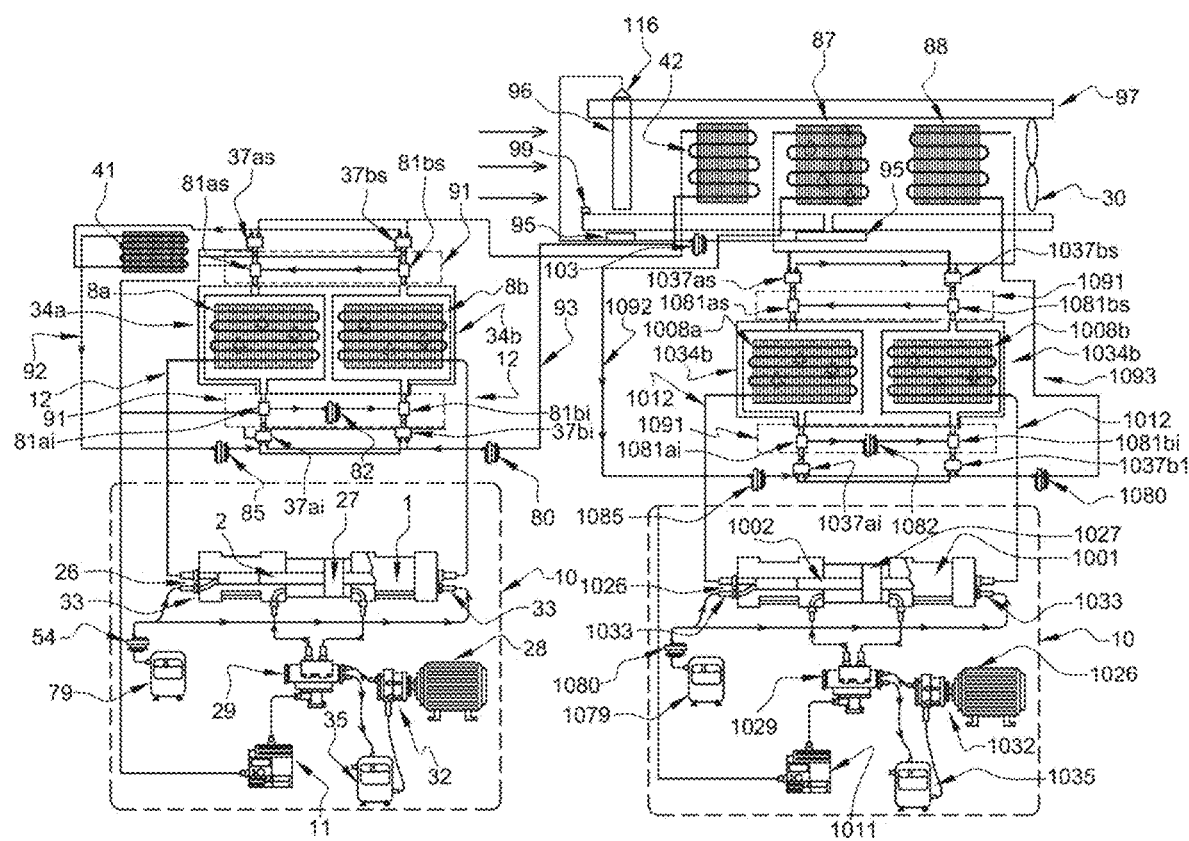
FIG. 6 shows the cooling or heating system with the water extraction system.

In another preferred configuration, as shown in FIG. 6, the system also comprises, in parallel, a second system, which comprises:
a) at least one force unit (1010), capable of increasing or decreasing thermal working fluid pressure, wherein the force unit (1010) comprises: a cylinder (1001), which comprises inside at least one plunger (1002) which is joined to a piston (1027), wherein the piston (1027) moves alternately through the activation of a directional control valve (1029) that receives a hydraulic fluid from a hydraulic pump (1032);
b) at least one dosed chamber connected to the cylinder (1001), wherein that closed chamber comprises:
at least one tube (1012) joined with
at least one closed radiator (1008a, 1008b) wherein the thermal working fluid is compressed within that closed chamber, wherein the change from liquid to solid state or vice versa occurs, or from a solid state to another solid state or vice versa; and
c) a control unit (1011), which regulates the operation of the directional control valve (1029) according to the temperature and pressure obtained from the closed chamber;
d) a first heat transfer circuit (1092) which comprises:
a valve (1037ia) that is joined to a valve (1081ia) at the intake, at least one phase change heat exchanger (1034) that comprises a radiator (1008a) on its first side;
at the exhaust of the phase change heat exchanger (1034), a valve (1081sa) is joined, which is then joined to a valve (1037sa), to then connect to a first heat exchanger (1087), from which a valve (1037ia) 1s connection comes out to close the first heat transfer circuit (1092); e) a second heat transfer circuit (1093) which comprises:
a valve (1037ib) that is joined to a valve (1081ib) at the intake, at least one phase change heat exchanger (1034) that comprises a radiator (1008b) on its second side;
at the exhaust of the phase change heat exchanger (1034), a valve (1081sb) is joined, which is then joined to a valve (1037sb), to then connect to a second heat exchanger (88), from which a valve (1037ib) connection comes out to close the second heat transfer circuit (1093); a pipe (97) that comprises the following components according to the air flow.
a temperature and humidity sensor (99), located at the proximal end of that pipe (97), which functionally communicates with the control unit (1011); and a fan (30), located at the distal end to extract air from the pipe (97);
the second heat exchanger (42) is located after the temperature and humidity sensor (99) to cool or heat an environment through the heat exchanger (41), said heat coming from the phase change heat exchanger (34A, 34B) according to the valve configuration (37*as*, 37*ai*, 37*bs*, 37*bi*), and then a third heat exchanger (87), which condenses the water from the environment, wherein the water passes through a pipe (97) opening and is deposited in a water accumulator (95). After the third heat exchanger (87) is a fourth heat exchanger (88) which transfers heat to the air, said heat coming from the phase change heat exchanger (1034A, 1034B) according to the valve configuration (1037*as*, 1037*ai*, 1037*bs*, 1037*bi*), and the control unit (1011) also regulates the operation of the valves (1037*as*, 1037*ai*, 1037*bs*, 1037*bi*; 1081*ai*, 1081*bs*, 1081*bi*; 1081*as*, 1081*ai*, 1081*bs*, 1081*bi*).

Figure 7:
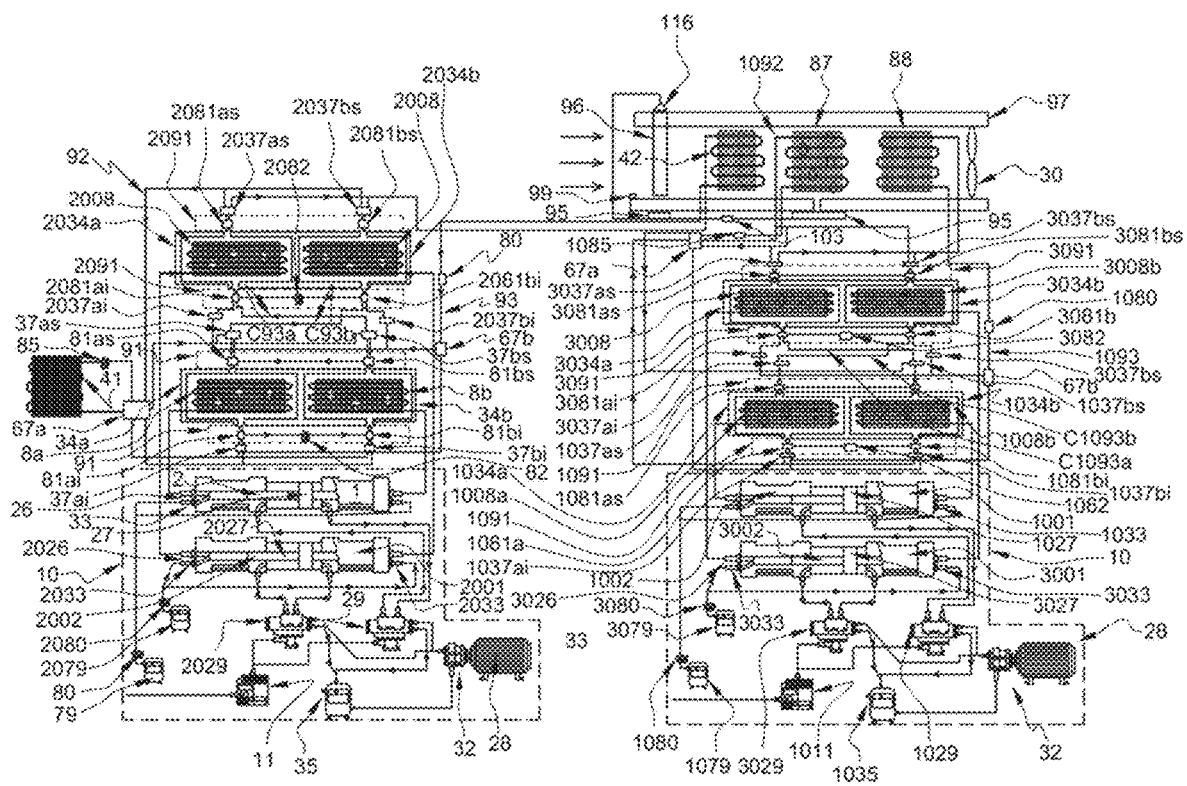
FIG. 7 shows the cooling or heating system with the water extraction system with cascade or parallel operation.

In another preferred configuration, as shown in FIG. 7, the system also comprises, in parallel,
- a second subsystem (1000), wherein the first heat exchanger (41) is replaced by a third heat exchanger (87) and the second heat exchanger (42) is replaced by a fourth heat exchanger (88), and also comprises:
- a pipe (97) that comprises the following components according to the air flow: a temperature and humidity sensor (99), located at the proximal end of that pipe (97), which functionally communicates with the control unit (11), and a fan (30), located at the distal end to extract air from the pipe (97);
- the second heat exchanger (42) is located after the temperature and humidity sensor (99) to surrender heat to the air, said heat coming from the phase change heat exchanger (34A, 34B) according to the valve configuration (37*as*, 37*ai*, 37*bs*. 37*bi*), and then a third heat exchanger (87), which condenses the water from the environment, wherein the water passes through a pipe (97) opening and is deposited in a water accumulator (95). After the third heat exchanger (87) is a fourth heat exchanger (88) which transfers heat to the air, said heat coming from the phase change heat exchanger (1034A, 1034B) according to the valve configuration (1037*as*, 1037*ai*, 1037*bs*, 1037*bi*) and through other selector valves of the heat exchanger (67A, 67B).

In another preferred configuration, in the proximal end of the pipe (97) there is also a humidifier to increase the humidity of the intake air, wherein the humidifier is a water sprayer (116).

In another preferred configuration, the water accumulator (95) is connected to the water sprayer (116) to provide it with water.

In another preferred configuration, the humidifier also comprises a mesh (96) under the water sprayer (116) to improve water distribution.

In another preferred configuration, the water accumulator (95) connects to a water treatment system, for human, animal, or vegetable use, not shown in the figures.

This technology also comprises a method to extract water from the environment and control temperature through heat transfer between two or more environments, with low energy consumption, for domestic, commercial, or industrial use, which applies, as seen in FIG. 1, wherein the method comprises the following steps:
a) insert a thermal working fluid into a closed chamber connected to a cylinder (1), wherein that closed chamber comprises at least one tube (12) joined with at least one radiator (8*a*, 8*b*);
b) regulate the operation of the directional control valve (29) according to the temperature and pressure obtained from the closed chamber, through a control unit (11);
c) compress the thermal working fluid according to the phase diagram of each thermal working fluid, to increase the temperature of that thermal working fluid within the closed chamber to transfer heat to the second heat transfer circuit (93) through some valves (37*as*, 37*ai*, 37*bs*, 37*bi*) and decompress the opposite side to cool the thermal working fluid, according to the phase diagram of each thermal working fluid of the opposite side to decrease the temperature of that fluid within that closed chamber, to absorb heat from the first heat transfer circuit (92) through some valves (37*as*, 37*ai*, 37*bs*, 37*bi*) through at least one force unit (10), wherein the force unit (10) comprises: a cylinder (1), which comprises within it at least one plunger (2) joined to a piston (27), wherein the piston (27) alternately moves through the activation of a directional control valve (29) which receives hydraulic fluid from a hydraulic pump (32),
d) produce the change of state of the thermal working fluid from liquid to solid or vice versa, or from a solid state to another solid state or vice versa, due to the increase in pressure, according to the phase diagram of each thermal working fluid; and
e) balance the temperatures of both chambers (34*a*, 34*b*) through the recirculation of a heat transfer fluid which is guided by some valves (81*ai*, 81*bs*, 81*bi*; 81*as*) operated by a control unit (11), while the thermal working fluid is kept compressed within that closed chamber;
f) decrease the temperature of the compressed side of the chamber (34) until it is lower than the temperature of the other side of the chamber (34) that was not compressed in the prior step, wherein some valves (37*as*, 37*ai*, 37*bs*, 37*bi*) allow the heat transfer fluid of the first heat transfer circuit (92) to pass through a first heat exchanger (41), and the valves (37*as*, 37*ai*. 37*bs*, 37*bi*) allow for a temperature increase of the decompressed side of the chamber (34) until it is higher than the temperature of the other side of the chamber (34) which was compressed in the prior step, through a fluid of the second heat transfer circuit (93), which passes through a second heat exchanger (42), wherein the valves (37*as*, 37*ai*, 37*bs*, 37*bi*) are operated by a control unit (11);
g) decompress the thermal working fluid within that closed chamber, from the side that was initially compressed, and compress the thermal working fluid from the other closed chamber through the activation of a directional control valve (29), without activating the valves (37*as*, 37*ai*, 37*bs*. 37*bi*), to once again provoke the change of state due to the low pressure and temperature, according to the phase diagram of each thermal working fluid;
h) repeat stages e) through g) until the desired temperature is reached in the first (41) and second (42) heat exchangers.

In another preferred configuration, as shown in FIG. 2, the method also comprises the following steps:
provide a pipe (97) in which the first heat exchanger (41) and the second heat exchanger (42) are inserted; and
extract water from the air flow, through condensation within the pipe (97), when precipitating the water in a water accumulator (95) that is between the first heat exchanger (41) and the second (42) in the same pipe (97).

In another preferred configuration, as shown in FIG. 3, the method also comprises the following steps:

recirculate the air or humid air from a pipe (97) through an air recirculation system (153) that comprises a fan (152) within an air pipe, so the air enters and exits the pipe (97) through some diffusers (155), which are located downstream from the first heat exchanger (41).

In another preferred configuration, as shown in FIG. 6, the method also comprises the following parallel operation steps:
  a) insert the thermal working fluid into a closed chamber connected to a cylinder (1001), wherein that closed chamber comprises at least one tube (1012) joined with at least one radiator (1008*a*, 1008*b*);
  b) regulate the operation of the directional control valve (29) according to the temperature and pressure obtained from the closed chamber, through a control unit (11);
  c) compress the thermal working fluid according to the phase diagram of each thermal working fluid, to increase the temperature of that thermal working fluid within the closed chamber to transfer heat to the second heat transfer circuit (1093) through some valves (1037*as*, 1037*ai*, 1037*bs*, 1037*bi*) and decompress the opposite side to cool the thermal working fluid, according to the phase diagram of each thermal working fluid of the opposite side to decrease the temperature of that fluid within that closed chamber, to absorb heat from the first heat transfer circuit (1092) through some valves (1037*as*, 1037*ai*, 1037*bs*, 1037*bi*) through at least one force unit (10), wherein the force unit (10) comprises: a cylinder (1001), which comprises within at least one plunger (1002) joined to a piston (1027), wherein the piston (1027) alternately moves through the activation of a directional control valve (1029) which receives hydraulic fluid from a hydraulic pump (1032); d) produce the change of state of the thermal working fluid from liquid to solid or vice versa, or from a solid state to another solid state or vice versa, due to the increase in pressure, according to the phase diagram of each thermal working fluid; and
  e) balance the temperatures of both chambers (1034*a*, 1034*b*) through the recirculation of a heat transfer fluid which is guided by some valves (1081*ai*, 1081*bs*, 1081*bi*, 1081*as*) operated by a control unit (1011), while the thermal working fluid is kept compressed within that closed chamber;
  f) decrease the temperature of the compressed side of the chamber (1034) until it is lower than the temperature of the other side of the chamber (1034) that was not compressed in the prior step, wherein some valves (1037*as*, 1037*ai*, 1037*bs*, 1037*bi*) allow the heat transfer fluid of the first heat transfer circuit (1092) to pass through a third heat exchanger (87), and the valves (1037*as*, 1037*ai*, 1037*bs*, 1037*bi*) allow for a temperature increase of the decompressed side of the chamber (1034) until it is higher than the temperature of the other side of the chamber (1034) which was compressed in the prior step, through a fluid of the second heat transfer circuit (1093) which passes through a fourth heat exchanger (88), wherein the valves (1037*as*, 1037*ai*, 1037*bs*, 1037*bi*) are operated by a control unit (1011);
  g) decompress the thermal working fluid within that closed chamber, from the side that was initially compressed, and compress the thermal working fluid from the other closed chamber through the activation of a directional control valve (1029), without activating the valves (1037*as*, 1037*ai*, 1037*bs*, 1037*bi*), to once again provoke the change of state due to the low pressure and temperature, according to the phase diagram of each thermal working fluid;
  h) repeat stages e) through g) until the desired temperature is reached in the third (87) and fourth (88) heat exchangers;
  i) provide a pipe (97) in which first the second heat exchanger (42) is inserted, then the third (87), and the fourth (88);
  j) extract water from the air flow through condensation within the pipe (97), when precipitating the water in a water accumulator (95) that is below the third heat exchanger (87) in the same pipe (97).

In another preferred configuration, as shown in FIG. 3, the method also comprises the following steps:
  provide a temperature and humidity sensor (99), located in the proximal end of that pipe (97), to control the system to extract water from the environment through a control unit (11).

In another preferred configuration, as shown in FIG. 4, the method to extract water from the environment and control temperature through the heat transfer between two or more environments, with low energy consumption, for domestic, commercial, or industrial use, comprises the following steps:
  a) insert two thermal working fluids with different temperatures for changing states each into a closed chamber (34*a*, 34*b*, 2034*a*, 2034*b*) each connected to a respective cylinder (1, 2001), wherein, those closed chambers (34*a*, 34*b*, 2034*a*, 2034*b*) comprise at least one tube (12, 2012) joined to at least one radiator (8*a*, 8*b*, 2008*a*, 2008*b*);
  b) regulate the operation of the directional control valve (29, 2029) according to the temperature and pressure obtained in each closed chamber, through a control unit (11);
  c) compress the thermal working fluid according to the phase diagram of each thermal working fluid, to increase the temperature of that thermal working fluid within the closed chamber (2034*a*, 2034*b*) to transfer heat to the second heat transfer circuit (93) through some valves (2037*as*, 2037*ai*, 2037*bs*, 2037*bi*) and decompress the opposite side (2034*a* or 2034*b*) to cool the thermal working fluid, according to the phase diagram of each thermal working fluid to decrease the temperature of that fluid within that closed chamber (2034*a* or 2034*b*), to absorb heat from the auxiliary heat transfer circuit (C93*a* or C93*b*) that joins the closed chamber (2034*a* or 2034*b*) to some closed chambers (34*a*, 34*b*), which has the decompressed thermal working fluid absorbing heat with the closed chamber (34*a*. 34*b*) which has the compressed thermal working fluid surrendering heat;
  d) decompress the opposite side of the closed chamber (34*a*, 34*b*) that has compressed thermal working fluid to cool the thermal working fluid, according to the phase diagram of each thermal working fluid to decrease the temperature of that fluid within that closed chamber, to absorb heat from the first heat transfer circuit (92) through some valves (37*as*, 37*ai*, 37*bs*, 37*bi*) through at least one force unit (10), wherein the force unit (10) comprises: a cylinder (1), which comprises within at least one plunger (2) joined to a piston (27), wherein the piston (27) alternately moves through the activation of a directional control valve (29) which receives hydraulic fluid from a hydraulic pump (32);
  e) produce the change of state of the thermal working fluids, from liquid to solid or vice versa or from a solid state to another solid state or vice versa, from the increase in pressure, according to the phase diagram of each thermal working fluid; and f) balance the temperatures of both chambers (34*a*, 34*b*, 2034*a*, 2034*b*) through the recirculation of a heat transfer fluid which is guided by some valves (81*ai*, 81*bs*, 81*bi*; 81*as*) and (2081*ai*, 2081*bs*, 2081*bi*, 2081*as*) operated by a control unit (11), while the thermal working fluid is kept compressed within those closed chambers (34*a*, 34*b*, 2034*a*, 2034*b*);

g) decrease the temperature of the compressed side of the chamber (34*a* or 34*b*) through some valves (37*as*, 37*ai*. 37*bs*, 37*bi*) until it is lower than the temperature of the opposite side of the chamber (34*a* or 34*b*) that was decompressed in the prior step, through the fluid of the first heat transfer circuit (92) that passes through a first heat exchanger (41), the valves (2037*as*, 2037*ai*, 2037*bs*, 2037*bi*) allow for the temperature increase of the decompressed side of the chamber (2034*a* or 2034*b*) until it is higher than the temperature of the other side of the chamber (2034*a* or 2034*b*) which was compressed in the prior step, through a fluid of the second heat transfer circuit (93) which passes through a second heat exchanger (42), and the valves (37*as*, 37*ai*. 37*bs*, 37*bi*) and (2037*as*, 2037*ai*, 2037*bs*, 2037*bi*) allow for the temperature increase of the closed chamber (34*a* or 34*b*) with decompressed fluid and decrease the temperature of the closed chamber (2034*a* or 2034*b*) with compressed fluid through an auxiliary heat transfer circuit (C93*a* or C93*b*), wherein the valves (37*as*, 37*ai*, 37*bs*, 37*bi*) and (2037*as*, 2037*ai*, 2037*bs*, 2037*bi*) are operated by a control unit (11), h) decompress the thermal working fluid within those closed chambers (34*a*, 34*b*, 2034*a*, 2034*b*), from the side that was initially compressed, and compress the thermal working fluid within the other closed chamber through the activation of a directional control valve (29) or (2029), without activating the valves (37*as*, 37*ai*, 37*bs*, 37*bi*) nor the valves (2037*as*, 2037*ai*, 2037*bs*, 2037*bi*), to once again provoke the change of state due to the low pressure and temperature, according to the phase diagram of each thermal working fluid;

i) repeat stages f) through h) until the desired temperature is reached in the first (41) and second (42) heat exchangers.

In another preferred configuration, as shown in FIG. 5, after repeating stages f) through h) until the desired temperature is reached in the first (41) and second (42) heat exchangers, the method also comprises activating the shut-off valve (67*a*), depending on the ambient temperature and humidity, to circulate the fluid of the first heat transfer circuit (92) through the chamber (2034*a*, 2034*b*) or activating the shut-off valve (67*b*) to circulate the fluid of the second heat transfer circuit (93) through the chamber (34*a*. 34*b*).

In another preferred configuration, as shown in FIG. 7, the following steps are included:

provide a pipe (97) in which the first (41) and second (42) heat exchangers are inserted;

extract water from the air flow through condensation within the pipe (97), when precipitating the water in a water accumulator (95) that is between the first heat exchanger (41) and the second (42) in the same pipe (97).

In another preferred configuration, as shown in FIG. 3, the following steps are included:

is recirculate the air from the pipe (97) through an air recirculation system (153) that comprises a fan (152) within an air pipe so the air enters and exits the pipe (97) through some diffusers (155), which are located downstream from the first heat exchanger (41).

In another preferred configuration, as shown in FIG. 7, the method also comprises the following parallel operation steps:

a) insert two thermal working fluids with different temperatures for changing states each into a closed chamber (1034*a*, 1034*b*, 3034*a*, 3034*b*) each connected to a respective cylinder (1001, 3001), wherein, those closed chambers (1034*a*, 1034*b*. 3034*a*, 3034*b*) comprise at least one tube (1012, 3012) joined to at least one radiator (1008*a*, 1008*b*, 3008*a*, 3008*b*);

b) regulate the operation of the directional control valve (1029, 3029) according to the temperature and pressure obtained in each closed chamber, through a control unit (1011);

c) compress the thermal working fluid according to the phase diagram of each thermal working fluid, to increase the temperature of that thermal working fluid within the closed chamber (3034*a*, 3034*b*) to transfer heat to the second heat transfer circuit (1093) through some valves (3037*as*, 3037*ai*, 3037*bs*, 3037*bi*) and decompress the opposite side (3034*a* or 3034*b*) to cool the thermal working fluid, according to the phase diagram of each thermal working fluid to decrease the temperature of that fluid within that closed chamber (3034*a* or 3034*b*), to absorb heat from the auxiliary heat transfer circuit (C1093*a* or C1093*b*) that joins the closed chamber (2034*a* or 2034*b*) to some closed chambers (1034*a*, 1034*b*), which has the decompressed thermal working fluid absorbing heat with the closed chamber (1034*a*, 1034*b*) which has the compressed thermal working fluid surrendering heat;

d) decompress the opposite side of the closed chamber (1034*a*, 1034*b*) that has compressed thermal working fluid to cool the thermal working fluid, according to the phase diagram of each thermal working fluid to decrease the temperature of that fluid within that closed chamber, to absorb heat from the first heat transfer circuit (1092) through some valves (1037*as*, 1037*ai*, 1037*bs*, 1037*bi*) through at least one force unit (10), wherein the force unit (10) comprises: a cylinder (1001), which comprises within at least one plunger (1002) joined to a piston (1027), wherein the piston (1027) alternately moves through the activation of a directional control valve (1029) which receives hydraulic fluid from a hydraulic pump (1032);

e) produce the change of state of the thermal working fluids, from liquid to solid or vice versa or from a solid state to another solid state or vice versa, from the increase in pressure, according to the phase diagram of each thermal working fluid; and f) balance the temperatures of both chambers (1034*a*, 1034*b*, 3034*a*, 3034*b*) through the recirculation of a heat transfer fluid which is guided by some valves (1081*ai*, 1081*bs*, 1081*bi*; 1081*as*) and (3081*ai*, 3081*bs*, 3081*bi*; 3081*as*) operated by a control unit (1011), while the thermal working fluid is kept compressed within those closed chambers (1034*a*, 1034*b*. 3034*a*. 3034*b*);

g) decrease the temperature of the compressed side of the chamber (1034*a* or 1034*b*) through some valves (1037*as*, 1037*ai*, 1037*bs*, 1037*bi*) until it is lower than the temperature of the opposite side of the chamber (1034*a* or 1034*b*) that was decompressed in the prior step, through the fluid of the first heat transfer circuit (1092) that passes through a fourth heat exchanger (88), the valves (3037*as*, 3037*ai*, 3037*bs*, 3037*bi*) allow for the temperature increase of the decompressed side of the chamber (3034*a* or 3034*b*) until it is higher than the temperature of the other side of the chamber (3034*a* or 3034*b*) which was compressed in the prior step, through a fluid of the second heat transfer circuit (1093) which passes through a fourth heat exchanger (88), and the valves (37*as*, 37*ai*, 37*bs*, 37*bi*) and (2037*as*, 2037*ai*, 2037*bs*, 2037*bi*) allow for the temperature increase of the closed chamber (1034*a* or 1034*b*) which has decompressed fluid and decrease the temperature of the closed chamber (2034*a* or 2034*b*) which has compressed fluid through an auxiliary heat transfer circuit (C1093*a* or C1093*b*), wherein the valves (1037*as*, 1037*ai*. 1037*bs*, 1037*bi*) and (3037*as*, 3037*ai*, 3037*bs*, 3037*bi*) are operated by a control unit (1011);

h) decompress the thermal working fluid within those closed chambers (1034*a*, 1034*b*, 3034*a*, 3034*b*), from the side that was initially compressed, and compress the thermal working fluid within the other closed chambers through the activation of a directional control valve (1029) or (3029), without activating the valves (1037*as*, 1037*ai*, 1037*bs*, 1037*bi*) nor the valves (3037*as*, 3037*ai*. 3037*bs*, 3037*bi*), to once again provoke the change of state due to the low pressure and temperature, according to the phase diagram of each thermal working fluid;

i) provide a pipe (97) in which first the second heat exchanger (42) is inserted, then the third (87), and the fourth (88);

j) extract water from the air flow through condensation within the pipe (97), when precipitating the water in a water accumulator (95) that is below the third heat exchanger (87) in the same pipe (97); and k) repeat stages f) through h) until the desired temperature is reached in the third (87) and fourth (88) heat exchangers.

In another preferred configuration, the following is included:

pump accumulated water for use through a humidifier.

decrease the temperature of the air that enters through the pipe (97).

In another preferred configuration, the following steps are included:

provide a temperature and humidity sensor (99), located at the proximal end of that pipe (97) to control the system to extract water from the environment through a control unit (11).

In another preferred configuration, to heat an environment, the following steps are included:

a) insert a thermal working fluid into a closed chamber connected to a cylinder (1), wherein that closed chamber comprises at least one tube (12) joined with at least one radiator (8*a*, 8*b*);

b) regulate the operation of the directional control valve (29) according to the temperature and pressure obtained from the closed chamber, through a control unit (11);

c) compress the thermal working fluid according to the phase diagram of each thermal working fluid, to increase the temperature of that thermal working fluid within the closed chamber to transfer heat to the second heat transfer circuit (93) through some valves (37*as*, 37*ai*, 37*bs*, 37*bi*) and decompress the opposite side to cool the thermal working fluid, according to the phase diagram of each thermal working fluid of the opposite side to decrease the temperature of that fluid within that closed chamber, to absorb heat from the first heat transfer circuit (92) through some valves (37*as*, 37*ai*, 37*bs*, 37*bi*) through at least one force unit (10), wherein the force unit (10) comprises: a cylinder (1), which comprises within it at least one plunger (2) joined to a piston (27), wherein the piston (27) alternately moves through the activation of a directional control valve (29) which receives hydraulic fluid from a hydraulic pump (32);

d) produce the change of state of the thermal working fluid from liquid to solid or vice versa, or from a solid state to another solid state or vice versa, due to the increase in pressure, according to the phase diagram of each thermal working fluid; and e) balance the temperatures of both chambers (34*a*, 34*b*) through the recirculation of a heat transfer fluid which is guided by some valves (81*ai*, 81*bs*, 81*bi*, 81*as*) operated by a control unit (11), while the thermal working fluid is kept compressed within that closed chamber;

f) decrease the temperature of the compressed side of the chamber (34) until it is lower than the temperature of the other side of the chamber (34) that was not compressed in the prior step, wherein some valves (37*as*, 37*ai*, 37*bs*, 37*bi*) allow the heat transfer fluid of the first heat 1*s* transfer circuit (92) to pass through a second heat exchanger (42), and the valves (37*as*, 37*ai*. 37*bs*. 37*bi*) allow for the temperature increase of the decompressed side of the chamber (34) until it is higher than the temperature of the other side of the chamber (34) which was compressed in the prior step, through a fluid of the second heat transfer circuit (93) which passes through a first heat exchanger (41), wherein the valves (37*as*, 37*ai*, 37*bs*. 37*bi*) are operated by a control unit (11);

g) decompress the thermal working fluid within that closed chamber, from the side that was initially compressed, and compress the thermal working fluid from the other closed chamber through the activation of a directional control valve (29), without activating the valves (37*as*, 37*ai*, 37*bs*, 37*bi*), to once again provoke the change of state due to the low pressure and temperature, according to the phase diagram of each thermal working fluid:

repeat stages e) through g) until the desired temperature is reached in the second (42) and first (41) heat exchangers.

In another preferred configuration, to heat an environment, the following steps are included:

a) insert two thermal working fluids with different temperatures for changing states each into a closed chamber (34*a*, 34*b*, 2034*a*, 2034*b*) each connected to a respective cylinder (1, 2001), wherein, those closed chambers (34*a*, 34*b*, 2034*a*. 2034*b*) comprise at least one tube (12, 2012) joined to at least one radiator (8*a*, 8*b*, 2008*a*, 2008*b*);

b) regulate the operation of the directional control valve (29, 2029) according to the temperature and pressure obtained in each closed chamber, through a control unit (11);

c) compress the thermal working fluid according to the phase diagram of each thermal working fluid, to increase the temperature of that thermal working fluid within the closed chamber (2034*a*. 2034*b*) to transfer heat to the second heat transfer circuit (93) through some valves (2037*as*, 2037*ai*, 2037*bs*, 2037*bi*) and decompress the opposite side (2034*a* or 2034*b*) to cool the thermal working fluid, according to the phase diagram of each thermal working fluid to decrease the temperature of that fluid within that closed chamber (2034a or 2034b), to absorb heat from the auxiliary heat transfer circuit (C93a or C93b) that joins the closed chamber (2034a or 2034b) to some closed chambers (34a, 34b), which has the decompressed thermal working fluid absorbing heat with the closed chamber (34a, 34b) which has the compressed thermal working fluid surrendering heat;

d) decompress the opposite side of the closed chamber (34a, 34b) that has compressed thermal working fluid to cool the thermal working fluid, according to the phase diagram of each thermal working fluid to decrease the temperature of that fluid within that closed chamber, to absorb heat from the first heat transfer circuit (92) through some valves (37as, 37ai, 37bs, 37bi) through at least one force unit (10), wherein the force unit (10) comprises: a cylinder (1), which comprises within at least one plunger (2) joined to a piston (27), wherein the piston (27) alternately moves through the activation of a directional control valve (29) which receives hydraulic fluid from a hydraulic pump (32);

e) produce the change of state of the thermal working fluids, from liquid to solid or vice versa or from a solid state to another solid state or vice versa, from the increase in pressure, according to the phase diagram of each thermal working fluid; and f) balance the temperatures of both chambers (34a, 34b; 2034a, 2034b) through the recirculation of a heat transfer fluid which is guided by some valves (81ai, 81bs, 81bi; 81as) and (2081ai, 2081bs, 2081bi) operated by a control unit (11), while the thermal working fluid is kept compressed within those closed chambers (34a. 34b, 2034a, 2034b); g) decrease the temperature of the compressed side of the chamber (34a or 34b) through some valves (37as, 37ai, 37bs, 37bi) until it is lower than the temperature of the opposite side of the chamber (34a or 34b) 1s that was decompressed in the prior step, through the fluid of the first heat transfer circuit (92) that passes through a second heat exchanger (42), the valves (2037as, 2037ai, 2037bs, 2037bi) allow for the temperature increase of the decompressed side of the chamber (2034a or 2034b) until it is higher than the temperature of the other side of the chamber (2034a or 2034b) which was compressed in the prior step, through a fluid of the second heat transfer circuit (93) which passes through a first heat exchanger (41), and the valves (37as, 37ai, 37bs, 37bi) and (2037as, 2037ai, 2037bs, 2037bi) allow for the temperature increase of the closed chamber (34a or 34b) which has decompressed fluid and decrease the temperature of the closed chamber (2034a or 2034b) which has compressed fluid through an auxiliary heat transfer circuit (C93a or C93b), wherein the valves (37as, 37ai, 37bs. 37bi) and (2037as, 2037ai, 2037bs, 2037bi) are operated by a control unit (11);

h) decompress the thermal working fluids within those closed chambers (34a, 34b, 2034a, 2034b), from the side that was initially compressed, and compress the thermal working fluids within the other closed chambers through the activation of a directional control valve (29) or (2029), without activating the valves (37as, 37ai, 37bs, 37bi) nor the valves (2037as, 2037ai, 2037bs, 2037bi), to once again provoke the change of state due to the low pressure and temperature, according to the phase diagram of each thermal working fluid;

repeat stages f) through h) until the desired temperature is reached in the second (42) and first (41) heat exchangers.

Therefore, this system and method can be controlled, to heat and cool an environment, by controlling the intake and exhaust of a heat transfer fluid to the first heat exchanger (41) and second heat exchanger (42) through valves (37as, 37ai, 37bs, 37bi), all this depending on the configuration of temperature and humidity required by the user. The set of valves (37as, 37ai, 37bs, 37bi) are controlled by a control unit (11), which is in turn operated by a thermostat, depending on the automatic control of an air handler.

APPLICATION EXAMPLES

Below are eight examples for illustrative purposes, which must not be interpreted so as to limit the scope of this invention:

Example 1 Air Conditioning System

Two circuits are built confined to a closed chamber, formed by 2 kilograms of titanium radiators (8a, 8b) with a 9 mm internal diameter and a 0.8 mm thickness, composed by 41 lines of 43 cm connected by a manifold part of a closed chamber, which will have as a result of the P(VI) equation a 140 Mpa design pressure, for each unit to achieve the solidification to the required temperature of 1 kg of a thermal working fluid, in this case a phase change material "PCM," which has a fusion temperature to atmospheric pressure of 16° C. and work for this case to temperatures between 17° C. and 34° C., so the pressures within the system for this case vary between 0.1 and 140 Mpa. These radiators (8a, 8b) will be inserted each inside a heat exchanger (34), which will have a volume of 853 cm$^3$ to allow intake to a cold (92) and hot (93) circuit, volume of 400 cm$^3$ larger than the volume of the radiators (8a, 8b), which is 453 cm$^3$. Both heat exchangers (34) will be connected by valves (81) and a set of PVC tubes that will connect them; for this case, PVC tubes that can support a pressure of 80 mWC due to the water hammers as a result of the abrupt closure of the valves (81). The circuit or chamber is composed of two main steel tubes (12) with a 2 mm internal diameter, 2 mm thickness, and 0.5 m length, each connected on one end to a cylinder (1), which comprises within two plungers (2), which are joined to a piston (27), wherein the piston (27) moves alternately through the activation of a directional control valve (29), hereinafter linear intensifier pump, which receives hydraulic fluid from a hydraulic pump (32); on the other end of the closed chamber, wherein that chamber comprises a radiator (8) wherein a thermal working fluid is compressed within the closed chamber and the change of state from liquid to solid or vice versa occurs. The linear intensifier pump or pressure intensifier which is a part of the force unit (10) has a 482 mm length and a 152 mm diameter. It intensifies the pressure in a 1 to 6 ratio, therefore if the hydraulic oil that passes through the directional valve (29) is of 15 Mpa, the pressure in the side of the closed chamber where the PCM is will be 90 Mpa. The linear intensifier pump that is a part of the force unit (10) has a sensor that allows control of the intake of PCM through the valve (33) and control of the pressure for this case through a hydraulic pump (32) with its respective motor (28) or a similar part of the force unit (10) with a power of 700 W that moves the piston to change the state of the PCM fluid, with a one-way valve (29) activated electronically connected between the hydraulic pump and the linear intensifier pump. All the elements of this system that must be controlled will be connected to a control unit (11) through the tubes. The system is also made up of two thermostats, two pressure switches, 2 gauges, and two fans, each fan connected to a heat exchanger (42) and (41) through which a hot fluid and cold fluid circulate, which in turn pass through heat exchangers (34) which have, each, a closed chamber with the PCM that will transfer or absorb heat alternately; therefore, the circuit that contains a cold fluid will pass through the exchanger (34) which will be absorbing heat of this fluid, afterwards, this fluid will pass through the heat exchanger (42) which will be absorbing heat. While this happens, the circuit with the hot fluid will pass through the heat exchanger (34) that will be surrendering heat, the same fluid will enter through the heat exchanger (41) that will be surrendering heat; for this case, the fluid will be a mix of 80% water with 20% glycol. When the chamber surrendering heat stops doing so, the opposing chamber will stop absorbing heat, and in that moment, maintaining the pressure of each chamber, the low specific heat (91) system will be activated with the valves (81), which will not let water with glycol from the cold and hot circuits enter, and through a water pump (82), it will circulate the fluid that is made up, for this case, by the same mix of water and glycol which will balance the temperatures of both closed chambers formed by radiators (8a, 8b). When the temperatures are balanced with the low specific heat system, the side that was compressed will be decompressed, and the side that was decompressed will be compressed by absorbing heat. The objective of the cold fluid (92) and hot fluid (93) circuits is to transfer the absorbed and surrendered heat by the closed chambers that are inserted into the heat exchangers (34) to be surrendered or absorbed by the heat exchangers (42) and (41), therefore if the cold fluid enters at 20° C., the closed chamber radiators (8a, 8b) that have PCM inside will absorb heat and will lower the temperature, for this example, by 2° C. This 18° C. cooled fluid will come out of the exchanger (34) and will pass through the heat exchanger (41) inserted inside a room, which will recirculate the air through a fan to a 27° C. temperature and cool this air to 23° C., as a result from the heat absorption of this circuit that contains the cold fluid (92). With this, the cold fluid (92) will come out of the exchanger (41) at 20° C. and will come back into the exchanger (34) with the radiators (8a, 8b) that are absorbing heat. Simultaneously, the hot fluid (93) will come at a temperature 4° C. higher than the ambient temperature into the other heat exchanger (34) which has the radiators (8a, 8b) also with a PCM part of the closed chambers which are surrendering heat because this PCM is compressed to a higher pressure than its solidification curve, heating this fluid to 2° C. The fluid (93) will exit the heat exchanger (34) and enter the heat exchanger (42) inserted outside, which will be recirculating air through a fan at an ambient temperature, and heating this air to 3° C. with which this hot fluid (93) will exit the exchanger (42) at 2° C. higher than the temperature with which it entered and will enter the exchanger (34) again, which will have the radiators (8a, 8b) surrendering heat.

These cold (92) and hot (93) fluids will stop circulating through these exchangers (34) when the low specific heat (91) system is activated to change the exchanger (34) after the deactivation of the low specific heat (91) system through the valves (37).

To better understand the process, when the cold fluid (92) enters through the exchanger (34) that contains the radiators (8a, 8b) that contain the decompressed PCM absorbing heat, the hot fluid (93) will enter the exchanger (34) that contains the radiators (8a, 8b) that contain the compressed PCM surrendering heat. When the radiator (8a, 8b) circuits inserted within the exchangers (34) have stopped surrendering heat and therefore the radiators (8a, 8b) and the PCM have the same temperature of the cold fluid (92) that passed inside the exchanger (34) and the other radiator (8a, 8b) circuit and PCM have the same temperature of the hot fluid (93) that was passing through the other exchanger (34) when there is no more transfer due to the compression and decompression, the low specific heat (91) system will be activated, which will circulate a fluid that has the same characteristics as the fluids (92) and (93) through both exchangers (34), producing the objective, which is to balance the temperature of both the set of radiators (8a, 8b) and PCM. This happens with the activation of the valves (81) which will be at the intakes and exhausts of each heat exchanger (34). All of this is controlled by a respective control unit (11) (PLC and its datalogger). After achieving the balance of temperatures (same temperature for both chambers), the low specific heat (91) system will be deactivated with the valves (81) and with the valves (37) located at the intakes and exhausts of the exchangers (34), a new cycle of cold (92) and hot (93) fluid circulation will begin.

At the other end of the main tube (12), there is a tube (22) that in this case is a distributor (manifold), where the first plurality of tubes or similar (8) will be connected. The manifold tube (22) has a 2 mm internal diameter, a 2 mm thickness, and a 21 cm length. The radiators (8) or similar, have a 9 mm internal diameter and a 0.8 mm thickness, with 43 cm length each, forming a set of 41 radiators (8a, 8b) connected to the manifold tube distributor. For this case, the force unit (10) is made up of a linear intensifier pump (1), a hydraulic pump, an electric or diesel motor or similar (28), control unit (11), directional valve (29), thermal working fluid storage tank or phase change material or similar (79); its respective hydraulic pump (80) to insert the fluid or similar into the linear intensifier pump (FIG. 1) which will connect both circuits or closed chambers. 1s Furthermore, the AC system will also be made up of four valves (37) which control to which heat exchanger (FIG. 25, 27, 28, 30, 31) the cold (92) and hot (93) water flows will enter, in addition to its respective hydraulic pumps or similar (80) to circulate flows, a pump (82) to circulate the low specific heat (91) system flow, fans (30), heat exchangers (41, 42, 87, 88), and other elements that can be seen in the Figures (25, 27, 28, 30, 31), all connected to the control unit (11).

A phase change material, hereinafter PCM, is preferably introduced, and afterwards, the hydraulic cylinder pistons of the force unit (10) compress the pistons, extracting all the air from the system and leaving only the water, closing the free ends with a tube plug.

Afterwards, with the moving of the linear intensifier pump (1) piston or similar, the pressure of both circuits will be increased to 20 Mpa. Thanks to the work of the pressure intensifier, the circuit pressure will reach 120 Mpa (the intensifier has a 1:6 ratio) surrendering heat, afterwards for absorbing heat, it will decompress that same closed chamber.

Each closed chamber functions in the same way.

The unit force (10) through the linear intensifier pump (1) and its hydraulic pump (32), in combination with the heat transfer thermal process, varies the internal pressure of each closed chamber and with that produce changes in the state of the PCM. This produces the change of state of the PCM from liquid to solid during this contraction; for example, by absorbing heat with the melting of the PCM at a PCM temperature in the radiators (8) that form the closed chambers at 20° C. with the temperature of the other environment, in this case, cold fluid (92) above this temperature, and at the same time surrendering heat with the transformation from liquid to solid of the opposing circuit (closed chamber) since the unidirectional valve (29), or similar, will prevent the piston from returning. Thus, the PCM will stay compressed in a closed chamber while the opposing chamber is uncompressed.

The system also considers each time it compresses that it is supported by the push of the PCM contained in the opposing closed chamber, therefore, if the temperature that passes through the exchanger (42) (the hotter side) requires compression to 100 Mpa to reach the changes of state to a determined temperature. PCM will be inserted from the tank (79) by the refill or fill valve (33) in both closed chambers, which in this case are radiators (8a, 8b); with this insertion, a 75 Mpa pressure will be achieved on both sides. After this, the PCM will be compressed on one side to 100 Mpa resulting in solidification, while the radiators (8a, 8b) that are a part of the closed chamber of the opposite side, will contain PCM at 50 Mpa. While the PCM is solidifying, it will change density, thus the pressure will lower from 100 Mpa to 50 Mpa when it has finished surrendering heat. The low specific heat (91) system will be applied until both radiators' (8a, 8b) temperatures are balanced with the PCM thermal working fluid. When this process is over, the side that has the liquid PCM at 50 Mpa will be compressed until achieving a 100 Mpa pressure; instantaneously, the side that had solid PCM at 50 Mpa will lower its pressure to 0 Mpa and since this pressure is pushing a face of the plunger (2), this pressure that decreases from 50 to 0 Mpa will help because of this push to the hydraulic pump, and thus to the motor, to increase the PCM pressure of the opposing radiator circuit (8a, 8b). This causes a significant savings due to lower work W applied. This cycle repeats until the temperature that passes through the heat exchanger (42) increases or decreases; when this happens, more PCM will be inserted or extracted through the same valves (33) so the equilibrium pressure of 75 Mpa when the PCM of both sides is liquid decreases or increases. Therefore, this insertion or extraction will have to be controlled by the control unit (11), which will include a PLC and a datalogger.

During these processes, the control system receives the information on the position of the pistons and of two temperature and pressure sensors, each placed in the capillary tubes of each secondary tube in each circuit, obtain information of the temperature inside them and the temperature outside. The role of the control system is to control the changes of state through a force unit (10), the components and auxiliary equipment, for example, control the ventilation flaps (40), so the cold or hot air flow is expelled or introduced through the ventilation pipe (31) to a determined place according to the case. Furthermore, to avoid passing the maximum design pressure when the system stops, the control system will activate the valve (33) or similar to release pressure.

When the change of state between a liquid state to a solid state of the PCM occurs, there is a change in volume of approximately 4 to 11% depending on the pressure required for this phase change, and this change causes the system, through its radiators (8a, 8b), to surrender heat. When there is a change between a solid or partially solid state to a liquid or partially liquid state, the system absorbs heat, which in this case has a thermal capacity of absorbing or surrendering 20,000 BTU/h with a coefficient of performance (COP) of 20.

This process repeats continuously all day, as long as is required. The control system will control the initial temperature of the PCM and circuits (92) and (93) to achieve the desired temperature. The PCM will surrender heat when it is solidified, and it will absorb heat when it is melting. All of this absorbed or surrendered heat will cause the changes in state mentioned above.

In the case of wanting to use this AC system as a generator or extractor of water from the air or air water generation (AWG), the heat exchanger (42) can be separated in two units, and when water must be produced, the hot circuit (93) will pass through one side and the cold water circuit (92) will pass through the other side, which will result in a decrease of the outside air that passes through the exchanger (42) or a new exchanger (41) that contains the cold circuit (92) flowing through the tubes; when this decrease of air reaches the dew temperature (psychrometric diagram), the air will be saturated, therefore the water will condense and form drops of water that can be used. If needed, this water can be filtered for human consumption.

Example 2 AWG Water Extraction System

A device like the one in FIG. 2 is built. This is similar to the device of Example 1 FIG. 1, but the heat exchanger (41) is replaced by a heat exchanger (87) which functions as a heat absorber, in this case a fan coil and the heat exchanger (42) for a heat exchanger (88), which functions as a heat exchanger that transfers heat, in this case a dry cooler. The heat exchanger (87) will absorb heat from the air that passes through it bordering the tubes that have cold fluid (92), the air is cooled to a temperature lower than the dew point, therefore it will be saturated, according to the psychrometric diagram, and with this the water contained in the air will be condensed and will lower the quantity of grams of water by kilogram of dry air. This results in water which can be filtered afterwards, this cooled air that passed through the heat exchanger (87) will pass through the heat exchanger (88) which has tubes with the hot fluid circuit (93). When passing air that is colder than the outside air, the force unit (10) works to a lower intensity due to the lower pressure needed, which results in a decrease of the compressor device and/or ventilation (30) of the exchanger (88) due to the decrease of temperature of the air that passes through this exchanger. Therefore, the system to extract water from the environment uses this as an extractor of water from the air.

The cold and hot circuits will operate in the same way as Example 1, that is, they will intake alternately through the heat exchangers (34) which have the radiators (8) or similar inserted, the thermal working fluid or phase change material (PCM).

This 20.000 BTU/h device could produce with an 80% humidity over 40 liters of water per day with the fans working partially, and the consumption could be around 60 and 170 kwh per each m³ of water extracted from air, depending on the ambient humidity and temperature.

The system can pass the air that crosses the heat exchangers (87) through the exchanger (88), as well as recirculating part of the saturated air that exits the heat exchanger (87) with a high humidity to increase the relative humidity of the air that enters the heat exchanger (87) and with this lower the percentage of sensitive heat vs latent heat extracted, thus decreasing the percentage of sensitive heat extracted every 1 kj/kg of dry air of enthalpy.

Example 3 AC Cascade System

A device as seen in FIG. 5 is constructed; this is similar to the device from Example 1 FIG. 1, but to the heat exchangers from Example 1, which we will call number 1 and number 2, with a thermal working fluid or phase change material (hereinafter PCM) inserted into their closed chambers that for this example have a fusion temperature of 24° C., two additional exchangers (34) are added, which will work with their respective linear intensifier pump (1) (FIG. 5) with a PCM with a fusion temperature lower than the temperature of the closed chambers of exchangers 1 and 2, fusion temperature at atmospheric pressure for this example of 15° C.

With this cascade system the number of closed chambers, therefore exchangers (34), can be increased to four or more units. In the case of using four heat exchangers (34), we will call them exchangers numbers three and four, and they will have, as mentioned before, one closed chamber each with a PCM with fusion temperature lower than the initial chambers one and two. Therefore, the cold fluid (92), if there is a need to cool with a greater temperature difference and require the cascade system, will be connected with the chamber with the radiators (8a, 8b) or similar that is absorbing heat between chambers 3 and 4. Part of the expansion of the cascade method and system is that there will be a new circuit (C93) with the same fluid as the cold (92) and hot (93) fluids, for this example water-glycol, which will come out alternately from the heat exchanger (34) number three or four which will contain the radiators (8a, 8b) that are a part of the closed chamber surrendering heat; or will alternately enter the ORIGINAL heat exchanger (34) one or two that is absorbing heat through radiators (8a, 8b), part of the closed chamber, forming the cascade. Therefore, there will be the same number of closed chambers as set of radiators (8a, 8b) inserted within a heat exchanger (34), all of it controlled with the valves (37) and control units (11). The circuit (93) will continue to enter into the exchanger (34) 1 or 2 that has the radiators (8a, 8b) surrendering heat at a higher temperature, this is because these will have the phase change material with a higher fusion temperature at atmospheric pressure.

Only chambers 1 and 2 will be used if there is no need for such a high temperature variation; therefore in this case the valves (37) will be used to control that the cold fluid (92) does not enter the heat exchangers (34) number three or four, but directly enters heat exchanger (41) or (87) or similar, and shall re-enter heat exchanger (34) number one or two that is absorbing heat. On the other hand, only heat exchangers (34) number three or four will be used when there is no need for the cascade system, working in the same way as heat exchangers one and two, therefore circuits (92) and (93) will only exit and enter these exchangers, without entering exchangers (34) number one or two. Heat exchangers (34) number three and four will be used alone without exchanger number one or two if the hot fluid (93) is at a lower temperature than the PCM fusion/solidification temperature of the radiators (8a, 8b) that are a part of the closed chambers of exchangers one and two. At least two lineal intensifier pumps may be used (1) which will be, some heat exchangers (34a, 34b), chambers that contain the radiators (8a, 8b) inserted within the heat exchangers (34) one and two, and the other connected to chambers 3 and 4, chambers that contain the radiators (8a, 8b) inserted within heat exchangers (34) three and four, or, in the case of just one lineal intensifier pump (1), which when compressed will compress circuits 1 and 3 and afterwards 2 and 4.

The cascade system can be used with force units and heat exchangers as in the diagrams shown in FIGS. 17, 19, 20 and 21, 25, 27, 28, 30, and 31, with different types of pumps, including but not limited to those mentioned in the specifications. This system can be used in reverse for heating, changing the hot fluid to exchanger 41 or similar, and the cold fluid to heat exchanger 42 or similar. This cascade system can be used with multiple cascades; therefore, the temperature can be lowered or raised as many times as necessary through two or more linear intensifier pumps together with their respective closed chambers to achieve a greater difference in temperature between the hot source and the cold source or vice versa.

Example 4 Hybrid AC AWG System

A hybrid AC AWG system device is constructed, as shown in FIG. 6, similar to the device from Example 1 FIG. 7.

This hybrid system includes lowering air temperature through the humidification that enters one exchanger (42) part of the AC system. Afterwards, this heated air enters an exchanger (87) part of the AWG water extraction system which will cool to a temperature below the dew point of this humid air; then, the air will saturate and the water contained in the air will condense and fall into a water accumulator tank or similar (95), thus extracting grams of water per m$^3$ of air, which is shown in the psychrometric diagram through the axis of the grams of water per kilogram of dry air. This volume of water will be delivered to the humidifier (96), which can have an accumulator container or tank or similar (95) to accumulate water that falls without an effective use. To restart the process, the air that exits the exchanger (87) will pass through the exchanger (88) that is a part of the same AWG water extraction system which will heat it to be released to the environment.

This system has water accumulator tanks or similar (95) and an AWG water circuit (116) that joins these tanks and injects water to the humidifier (96), which humidifies through a panel or injecting through water dew at high pressure or any similar element.

The system has a small loss of water, because the exchanger (87) will not absorb 100% of the saturated air, therefore, as the device works as a water extractor, when the hybrid system is not activated, only the AWG system can be activated with its heat exchangers (87) and (88) to absorb and accumulate water. The system can also partially humidify with or without extracting water contained in the air again.

This system saves a great amount of energy since the great performance of the method allows water to be extracted with low energy consumption and this water can be used to lower temperature. Therefore, the heat exchanger (42) makes the force unit (10) of the AC system work with less of a load due to the lower temperature moving through the hot fluid circuit (93) because of the lower temperature of the air passing through the heat exchanger (42).

The dry cooler or heat exchanger (42) can also be used to transport the heat extracted from the heat exchanger (41) to the "free cooling" heat exchanger (42), through the circuits (92) and (93), without the need to use compression; as well as in the case of having the cascade system, only one of both can be used. Connecting circuit (92) or (93) to circuit (C93), so the free cooling would be connected to the equipment of exchangers three and four.

The operation options of the hybrid system are the following:
1—Absorb water contained in the air with its AWG water extraction system.
2—Completely or partially humidify with the stored water the air that passes through the heat exchanger (42) to lower the respective system's force unit (10) workload.
3—Completely or partially humidify with the stored water the air that passes through the heat exchanger (42) to lower the respective system's force unit (10) workload and extract the water contained through the heat exchanger (87) (FIG. 6).
4—Use the AC system with its heat exchanger (42) without humidifying.
5—Completely or partially humidify with the stored water the air that passes through the heat exchanger (42) to lower the respective system's force unit (10) workload without needing to use compression and produce the change of phase, using only the circuits (93) to make it pass through the heat exchanger (42) and heat exchanger (41) directly, which will be equipped with fans (10) if necessary.
6—All the prior steps can be applied using the hybrid system (FIG. 6) with the cascade AWG water extraction system (FIG. 4) and/or cascade AC system (FIG. 5), as well as using the free cooling directly with the heat exchangers (34) that have the phase change material with lower fusion/solidification temperature at atmospheric pressure.

This system saves a great amount of energy since the great performance of the method allows water to be extracted with great energy efficiency and the temperature can be lowered. Therefore, the heat exchanger (42) makes the force unit (10) of the AC system work with less of a load due to the lower temperature in moving through the hot fluid circuit (93), because of the lower temperature of the air passing through the heat exchanger (42).

The main results obtained during the thermal assessment performed to the phase change material (PCM)/air heat exchange system (device), performed in two stages. This report compiles the experimental temperature difference measurements performed to the different PCM compression pressures and the temperature of the air entering the device, also estimating the compression work performed by the pump (Stage 1). Although the results obtained for the heat released and absorbed by the air flow in the different cases analyzed are provided for both stages, in the second stage a validation of the hypothesis posed in the first stage regarding the high COP of the device is performed through a measurement of the pump's energy consumption. For this, a more efficient compression system was used than the one in Stage 1.

The second report describes the main results obtained during the second stage of the thermal assessment performed to the phase change material (PCM)/air heat exchange system (device). This report compiles the experimental temperature difference measurements performed to the different PCM compression pressures and the temperature of the air entering the device, also calculating the pump's energy consumption. In this stage, the results obtained for the heat released and absorbed by the air flow in the different cases analyzed are provided, and the hypothesis posed in the first stage is validated, regarding the high COP of the device, precisely through the measurement of the compression system energy consumption, more efficient than the one used in the first stage.

Figure 10:
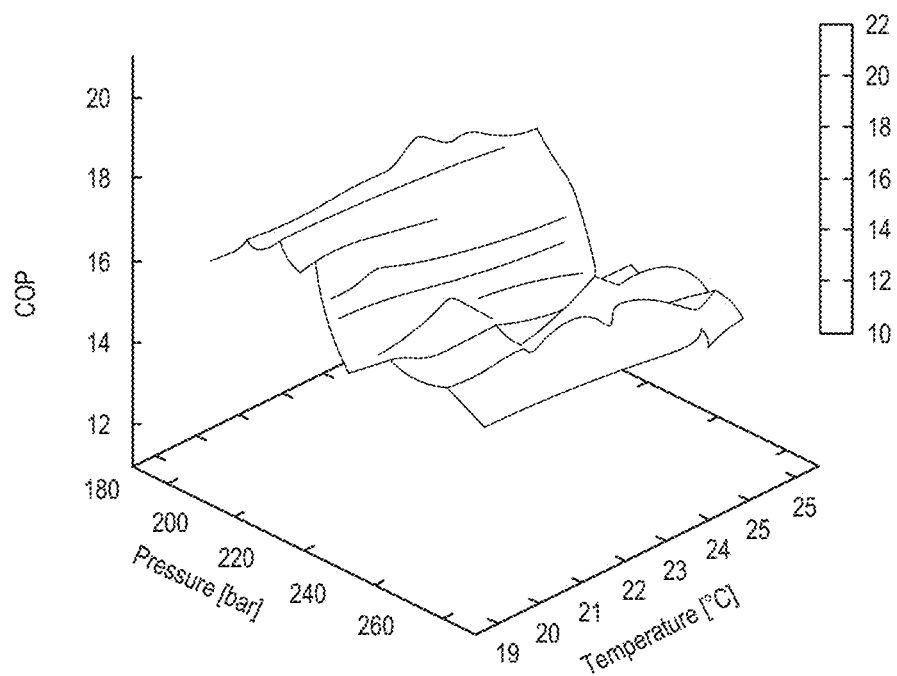
FIG. 10 shows the surface of the response obtained for the COP according to the intake pressure and temperature of the air, for a specific PCM, based on a biodegradable oil.

FIG. 10 shows the response surface obtained for the COP based on the air intake pressure and temperature. The higher COP value (20.26) was obtained at 220 [bar] and 21.7 [° C.]. The surface also shows a range of pressure where the COP presents minimum values (>220 [bar]). This is ratified in FIG. 10, which shows the coefficient of performance of the system discharge process.

Regarding the device's high COP potential, it has been validated in this second stage. The maximum COP observed during the charge and discharge process were of 19.55±0.57 and 20.26±0.59, respectively, obtained at a 220 [bar] pressure and a 22.0 [° C.] temperature.

Figure 8:
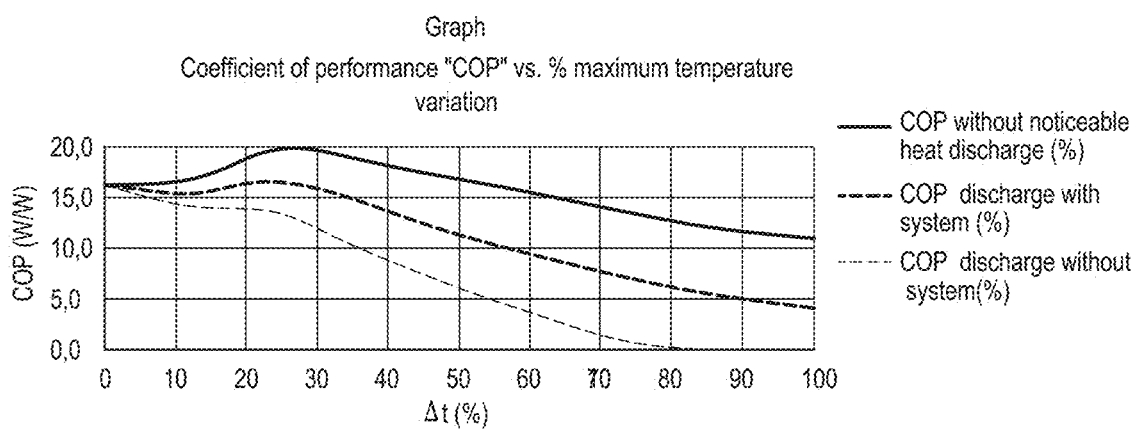
FIG. 8 shows a COP efficiency curve in W/W regarding a temperature variation.

The graph in FIG. 8 shows the COP, not COP percentage, in the second the COP percentage can be seen with a maximum T variation of 25° C.

| % of T variation ° C. | T variation ° C. | Series 1 Ideal COP (no noticeable heat loss) w/w | Series 2 COP with low specific heat system | Series 3 COP without low specific heat system |
| --- | --- | --- | --- | --- |
| 0 | 1 | 16.2 | 16.2 | 16.2 |
| 12.5 | 3 | 16.9 | 15.5 | 14.2 |
| 25 | 5 | 19.8 | 16.7 | 13.5 |
| 37.5 | 7 | 18.6 | 14.1 | 9.6 |
| 50 | 9 | 16.8 | 11.4 | 6.1 |
| 62.5 | 11 | 15.1 | 9.1 | 3.0 |
| 75 | 13 | 13.4 | 7.0 | 0.5 |
| 87.5 | 15 | 11.9 | 5.2 | 0.0 |
| 100 | 17 | 11.0 | 4.0 | 0.0 |

In this case, 100% COP is equal to a 19.8 COP and a 50% COP is equal to a 9.9 COP.

| % of T variation ° C. | T variation ° C. | Continuous line Normalized ideal curve at 100% (no noticeable heat loss) (%) | Dashed line % regarding the ideal curve with system of this invention WITH low specific heat | Dotted line % of normalized performance regarding the ideal curve without system of this invention WITHOUT low specific heat |
|---|---|---|---|---|
| 0 | 1 | 100.0 | 100.0 | 100.0 |
| 12.5 | 3 | 100.0 | 92.0 | 84.0 |
| 25 | 5 | 100.0 | 84.0 | 68.0 |
| 37.5 | 7 | 100.0 | 76.0 | 52.0 |
| 50 | 9 | 100.0 | 68.0 | 36.0 |
| 62.5 | 11 | 100.0 | 60.0 | 20.0 |
| 75 | 13 | 100.0 | 52.0 | 4.0 |
| 87.5 | 15 | 100.0 | 44.0 | 0.0 |
| 100 | 17 | 100.0 | 36.0 | 0.0 |

A temperature T variation of 50% is equal to 12.5 C and a delta T of 100% is equal to 25 C.

The "blue" continuous line is equal to the COP if the system were perfect and had no loss due to the change of temperature, or if the tubes and PCM had a specific heat of 0.

The dashed line "series 2 orange" is if there were the low specific heat subsystem, and the "gray" dotted lines are if there were no system, which is why at 80% it has a COP of 2 vs a COP of 6 (it is the mean between maximum and minimum) with the system. It is important to remember that the low specific heat subsystem is formed by some valves (37as, 37ai, 37bs, 37bi; 81ai, 81bs, 81bi; 81as, 81ai, 81bs, 81bi).

Figure 9:
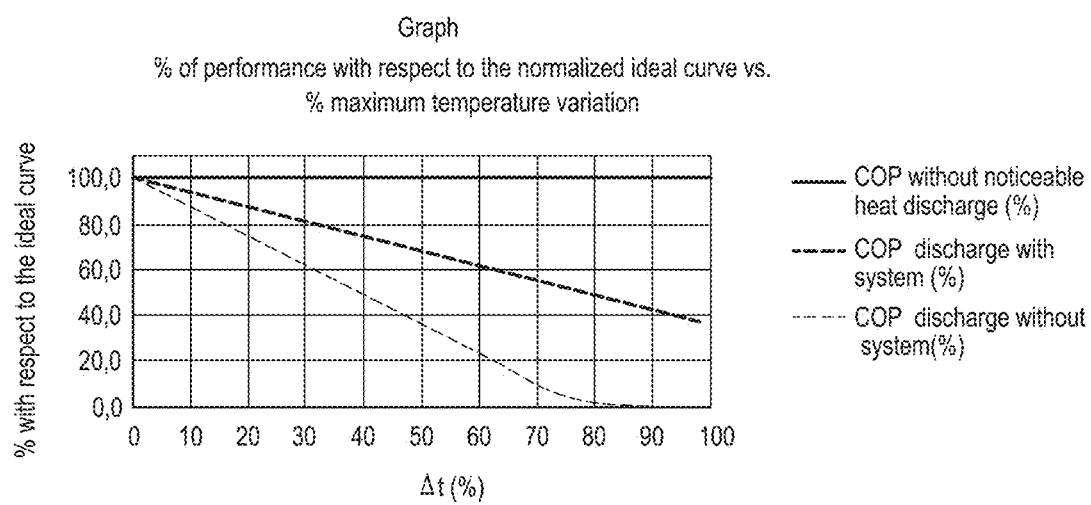
FIG. 9 shows a graph of the performance variation percentage (%) regarding the normalized ideal curve, which does not include energy losses, among others, for temperature variation among radiators (8a, 8b) due to the specific heat of the materials that make up these radiators (8a, 8b) including the PCM, with respect to the maximum temperature variation percentage (%).

The graph of FIG. 9 shows the COP; the graph of FIG. 9 shows the COP percentage with a maximum temperature T variation of 17° C. for a determined PCM.

A temperature variation of 50% is equal to 8.5° C. and a temperature variation of 100% is equal to 17° C., for the FIG. 9 example, wherein the continuous line is equal to the COP, if the system did not have energy losses because of the specific heat of the "ideal" materials and did not have losses due to the change of temperature, if the tubes and PCM had a specific heat of 0. Meanwhile, the dashed lines are related to this system that uses the low specific heat system and the dotted lines correspond to the application PCT/CL2018/050156 system, which does not use the low specific heat subsystem; therefore at 80% it has a COP of 2 vs a COP of 6 (the mean between the maximum and minimum) with the low specific heat subsystem.

The invention claimed is:

1. A system for heating or cooling an environment, with low energy consumption, for domestic, commercial, or industrial use, comprising:
   a) at least one force unit (10), capable of increasing or decreasing a pressure of a thermal working fluid;
   b) at least two closed chamber (34a, 34b) connected to the force unit (10), wherein each closed chamber comprises:
      at least one tube (12) joined with
      at least one closed radiator (8a, 8b), wherein the at least one force unit is configured to compress the thermal working fluid within that closed chamber, wherein a change from liquid to solid state or vice versa occurs, or from a solid state to another solid state or vice versa;
   c) a control unit (11), which is configured to regulate the operation of the force unit according to the temperature and pressure obtained from the closed chamber;
   d) a first heat transfer circuit (92) which comprises:
      a valve (37ai) that is joined to a valve (81ai) at an intake of at least one phase change heat exchanger (34a) that comprises a radiator (8a) on a first side of said phase change heat exchanger (34a);
      at an exhaust of the phase change heat exchanger (34a) a valve (81as) is joined which is then joined to a valve (37as) to then connect to a first heat exchanger (41), from which a valve (37ai) connection comes out to close the first heat transfer circuit (92);
   e) a second heat transfer circuit (93) which comprises:
      a valve (37bi) joined to a valve (81bi) at an intake of at least one phase change heat exchanger (34b) that comprises a radiator (8b) on a second side of said phase change heat exchange (34b);
      at an exhaust of the phase change heat exchanger (34b) a valve (81bs) is joined which is then joined to a valve (37bs) to then connect to a second heat exchanger (42), from which a valve (37bi) connection comes out to close the second heat transfer circuit (93), wherein the control unit (11) is configured to operate the valves (37as, 37ai, 37bs, 37bi; 81ai, 81bs, 81bi; 81as, 81ai, 81bs, 81bi).

2. The system according to claim 1, wherein the system is further to extract water from the environment, WHEREIN: the first heat exchanger (41) is before the second heat exchanger (42) within a same pipe (97), with respect to airflow, wherein, between the first (41) and second (42) heat exchanger there is a water accumulator (95).

3. The system according to claim 2, further comprising an air recirculation system (153), which comprises a fan (152) inside an air pipe so air enters and exits the pipe (97), through some diffusers (155), which are located downstream from the first heat exchanger (41).

4. The system according to claim 2, wherein the force unit (10) comprises:

a cylinder (1), which comprises inside at least one plunger (2), which is joined to a piston (27), wherein the piston (27) is configured to move alternately through the activation of a directional control valve (29) that is configured to receive a hydraulic fluid from a hydraulic pump (32);

wherein the force unit (10) also comprises a second cylinder (2001), which inside comprises at least one plunger (2002), joined to a piston (2027), wherein the piston (2027) is configured to move alternately through the activation of a directional control valve (2029) that is configured to receive hydraulic fluid from a hydraulic pump (32);

wherein, the first and second heat transfer circuit (92, 93) connect in series to an other first and second heat transfer circuit (92, 93) through selector valves of a heat exchanger (67A, 67B), wherein the other first and second heat transfer circuit (92, 93) are connected to the first and second heat exchanger (41, 42), and wherein:

a) the other first heat transfer circuit (92) that comprises:
  a valve (2037ai) which joins a valve (2081ai) at an intake of at least one phase change heat exchanger (2034) which comprises a radiator (2008a) on a first side of said phase change heat exchanger (2034);
  at an exhaust of the phase change heat exchanger (2034) a valve (2081as) is joined which is joined to a valve (2037as) to then connect to a first heat exchanger (41), from which a valve (2037ai) connection comes out to close the other first heat transfer circuit (92), and b) the second heat transfer circuit (93) that comprises:
  a valve (2037bi) that is joined to a valve (2081bi) at the intake at least one phase change heat exchanger (2034) that comprises a radiator (2008b) on a second side of said phase change heat exchanger (2034);
  at the exhaust of the phase change heat exchanger (2034) a valve (2081bs) is joined which is joined to a valve (2037bs) to then connect to the other second heat exchanger (42), from which a valve (37bi) connection comes out to close the other second heat transfer circuit (93).

5. The system according to claim 1, wherein the force unit (10) comprises:

a cylinder (1), which comprises inside at least one plunger (2), which is joined to a piston (27), wherein the piston (27) is configured to move alternately through the activation of a directional control valve (29) that is configured to receive a hydraulic fluid from a hydraulic pump (32);

wherein the force unit (10) also comprises a second cylinder (2001), which inside comprises at least one plunger (2002) joined to a piston (2027), wherein the piston (2027) is configured to move alternately through the activation of a directional control valve (2029) that is configured to receive hydraulic fluid from a hydraulic pump (32);

wherein, the first and second heat transfer circuit (92, 93) are connected in series to another first and second heat transfer circuit (92, 93), wherein the other first and second heat transfer circuit (92, 93) are connected to the first and second heat exchanger (41, 42), and wherein:

c) the other first heat transfer circuit (92) which comprises:
  a valve (2037ai) is joined to a valve (2081ai) at the intake, at least one phase change heat exchanger (2034) that comprises a radiator (2008a) on a first side of said phase change heat exchanger (2034);
  at the exhaust of the phase change heat exchanger (2034), a valve is joined (2081as) that is joined to a valve (2037as) to then connect to a first heat exchanger (41), from which a valve (2037ai) connection comes out to close the other first heat transfer circuit (92), and d) the other second heat transfer circuit (93) which comprises:
  a valve (2037bi) is joined to a valve (2081bi) at the intake, at least one phase change heat exchanger (2034) that comprises a radiator (2008b) on a second side of said phase change heat exchanger (2034);
  at the exhaust of the phase change heat exchanger (2034) a valve (2081bs) is joined which is joined to a valve (2037bs) to then connect to the other second heat exchanger (42), from which a valve (37bi) connection comes out to close the other second heat transfer circuit (93), forming a subsystem (2000).

6. The system according to claim 5, also comprising in parallel, a second subsystem (1000), wherein the first heat exchanger (41) is replaced by a third heat exchanger (87) and the second heat exchanger (42) is replaced by a fourth heat exchanger (88), and also comprises:

a pipe (97) that comprises the following components according to the air flow:
  a temperature and humidity sensor (99), located at a proximal end of that pipe (97), which is configured to functionally communicate with the control unit (11); and
  a fan (30), located at a distal end to extract air from the pipe (97);
the second heat exchanger (42) is located after the temperature and humidity sensor (99) to surrender heat to the air, said heat coming from the phase change heat exchanger (34A, 34B) according to the valve (37as, 37ai, 37bs, 37bi) configuration, and then the third heat exchanger (87), which is configured to condense the water from the environment, wherein the water is configured to pass through a pipe (97) opening and be deposited in a water accumulator (95), wherein after the third heat exchanger (87) the fourth heat exchanger (88) is arranged which is configured to transfer heat to the air, said heat coming from the phase change heat exchanger (1034A, 1034B) according to the valve configuration (1037as, 1037ai, 1037bs, 1037bi) and through other selector valves of the heat exchanger (67A, 67B).

7. The system according to claim 1, wherein the force unit (10) comprises:

a cylinder (1), which comprises inside at least one plunger (2), which is joined to a piston (27), wherein the piston (27) is configured to move alternately through the activation of a directional control valve (29) that is configured to receive a hydraulic fluid from a hydraulic pump (32);

wherein the system also comprises in parallel a second system that comprises:

a) at least one force unit (1010), capable of increasing or decreasing thermal working fluid pressure, wherein the force unit (1010) comprises: a cylinder (1001), which comprises inside at least one plunger (1002) which is joined to a piston (1027), wherein the piston (1027) is configured to move alternately through the activation of a directional control valve (1029) that is configured to receive a hydraulic fluid from a hydraulic pump (1032);

b) at least one closed chamber connected to the cylinder (1001), wherein that closed chamber comprises:
at least one tube (1012) joined with
at least one closed radiator (1008a, 1008b) wherein the at least one force unit is configured to compress the thermal working fluid within that closed chamber, wherein the change from liquid to solid state or vice versa occurs, or from a solid state to another solid state or vice versa; and c) a control unit (1011), which is configured to regulate the operation of the directional control valve (1029) according to the temperature and pressure obtained from the closed chamber;

d) a first heat transfer circuit (1092) which comprises:
a valve (1037ai) that is joined to a valve (1081ai) at an intake of at least one phase change heat exchanger (1034) that comprises a radiator (1008a) on a first side of said phase change heat exchanger (1034);
at an exhaust of the phase change heat exchanger (1034), a valve (1081as) is joined which is then joined to a valve (1037as) to then connect to a first heat exchanger (1087), from which a valve (1037ai) connection comes out to close the first heat transfer circuit (1092);

e) a second heat transfer circuit (1093) which comprises:
a valve (1037bi) that is joined to a valve (1081bi) at the intake of the phase change heat exchanger (1034) that comprises a radiator (1008b) on a second side of said phase change heat exchanger (1034);
at the exhaust of the phase change heat exchanger (1034), a valve (1081bs) is joined which is then joined to a valve (1037bs) to then connect to a second heat exchanger (88), from which a valve (1037bi) connection comes out to close the second heat transfer circuit (1093);
a pipe (97) that comprises the following components according to the air flow:
a temperature and humidity sensor (99), located at a proximal end of that pipe (97), which is configured to functionally communicate with the control unit (1011); and a fan (30), located at a distal end to extract air from the pipe (97);
the second heat exchanger (42) is located after the temperature and humidity sensor (99), configured to cool or heat the environment through the heat exchanger (41), said heat coming from the phase change heat exchanger (34A, 34B) according to the valve (37as, 37ai, 37bs, 37bi) configuration, and then a third heat exchanger (87), which is configured to condense the water from the environment, wherein the water is configured to pass through a pipe (97) opening and be deposited into a water accumulator (95), wherein after the third heat exchanger (87) a fourth heat exchanger (88) is arranged which is configured to transfer heat to the air, said heat coming from the phase change heat exchanger (1034A, 1034B), according to the valve (1037as, 1037ai, 1037bs, 1037bi) configuration, and the control unit (1011) also is configured to regulate the operation of the valves (1037as, 1037ai, 1037bs, 1037bi; 1081ai, 1081bs, 1081bi; 1081as, 1081ai, 1081bs, 1081bi).

8. The system to extract water from the environment, according to claim 7, wherein the proximal end of the pipe (97) also comprises a humidifier to increase the humidity of incoming air,
wherein optionally the humidifier is a water sprayer (116),
wherein optionally the water accumulator (95) connects to the water sprayer (116) to provide the water accumulator (95) with water.

9. A method for heating or cooling an environment, with low energy consumption, for domestic, commercial, or industrial use, wherein the method comprises the following steps:
a) insert a thermal working fluid into a closed chamber connected to a force unit (10), wherein the closed chamber comprises at least one tube (12) joined with at least one radiator (8a, 8b);
b) regulate an operation of the directional control valve (29) according to the temperature and pressure obtained from the closed chamber, through a control unit (11);
c) compress the thermal working fluid according to the phase diagram of the thermal working fluid, to increase the temperature of that thermal working fluid within a side of the closed chamber to transfer heat to a second heat transfer circuit (93) through some valves (37as, 37ai, 37bs, 37bi) and decompress the thermal working fluid within an opposite side of the closed chamber to cool the thermal working fluid, according to the phase diagram of the thermal working fluid to decrease the temperature of the thermal working fluid within that closed chamber, to absorb heat from the first heat transfer circuit (92) through some valves (37as, 37ai, 37bs, 37bi) through at least one force unit (10);
d) produce the change of state of the thermal working fluid from liquid to solid or vice versa, or from a solid state to another solid state or vice versa, due to the increase in pressure, according to the phase diagram of the thermal working fluid; and
e) balance the temperatures of the two closed chambers (34a, 34b) through the recirculation of a heat transfer fluid which is guided by some valves (81ai, 81bs, 81bi; 81as) operated by a control unit (11), while the thermal working fluid is kept compressed within that closed chamber;
f) decrease the temperature of the compressed side of the closed chamber (34) until said temperature is lower than the temperature of the opposite side of the closed chamber (34) that was not compressed in the prior step, wherein some valves (37as, 37ai, 37bs, 37bi) allow the heat transfer fluid of the first heat transfer circuit (92) to pass through a first heat exchanger (41), and the valves (37as, 37ai, 37bs, 37bi) allow for the temperature increase of the decompressed side of the closed chamber (34) until said temperature is higher than the temperature of the opposite side of the closed chamber (34) which was compressed in the prior step, through a fluid of the second heat transfer circuit (93) which passes through a second heat exchanger (42), wherein the valves (37as, 37ai, 37bs, 37bi) are operated by a control unit (11);
g) decompress the thermal working fluid within that closed chamber, from the side that was initially compressed, and compress the thermal working fluid from the other closed chamber through the activation of a directional control valve (29), without activating the valves (37as, 37ai, 37bs, 37bi), to once again provoke the change of state due to the low pressure and temperature, according to the phase diagram of the thermal working fluid;

h) repeat through g) until the desired stages e) temperature is reached in the first (41) and second (42) heat exchangers.

10. The method according to claim 9, wherein the method comprises the following steps:

providing a pipe (97) in which the first heat exchanger (41) and the second heat exchanger (42) are inserted; and extracting water from the air flow through condensation within the pipe (97), when precipitating the water in a water accumulator (95) that is between the first heat exchanger (41) and the second (42) in the same pipe (97).

11. The method according to claim 10, wherein the method comprises the following step:

providing a temperature and humidity sensor (99), located in a proximal end of that pipe (97), to control the system to extract water from the environment through a control unit (11).

12. The method to extract water from the environment, according to claim 9, wherein the method also comprises the following:

recirculating the air or humid air from a pipe (97) through an air recirculation system (153) that comprises a fan (152) within an air pipe, so the air enters and exits the pipe (97) through some diffusers (155), which are located downstream from the first heat exchanger (41).

13. The method to extract water from the environment, according to claim 9, wherein the method also comprises the following parallel operation steps:

inserting a second thermal working fluid into a second closed chamber connected to a second force unit, wherein the second closed chamber comprises at least one tube (1012) joined with at least one radiator (1008*a*, 1008*b*);

regulating the operation of the directional control valve (29) according to the temperature and pressure obtained from the second closed chamber, through the control unit (11);

compressing the second thermal working fluid according to the phase diagram of each thermal working fluid, to increase the temperature of the second thermal working fluid within a side of the second closed chamber to transfer heat to the second heat transfer circuit (1093) through some valves (1037*as*, 1037*ai*, 1037*bs*, 1037*bi*) and decompress an opposite side of the second closed chamber to cool the second thermal working fluid, according to the phase diagram of each thermal working fluid of the opposite side to decrease the temperature of the second thermal working fluid within the second closed chamber, to absorb heat from the first heat transfer circuit (1092) through some valves (1037*as*, 1037*ai*, 1037*bs*, 1037*bi*) through the second force unit (10);

producing the change of state of the second thermal working fluid from liquid to solid or vice versa, or from a solid state to another solid state or vice versa, due to the increase in pressure, according to the phase diagram of the second thermal working fluid; and balancing the temperatures of the first and second closed chambers (1034*a*, 1034*b*) through the recirculation of a heat transfer fluid which is guided by some valves (1081*ai*, 1081*bs*, 1081*bi*; 1081*as*) operated by a second control unit (1011), while the thermal working fluid is kept compressed within the second closed chamber;

decreasing the temperature of the compressed side of the chamber (1034) until the temperature is lower than the temperature of the other side of the chamber (1034) that was not compressed in the prior step, wherein some valves (1037*as*, 1037*ai*, 1037*bs*, 1037*bi*) allow the thermal working fluid of the first heat transfer circuit (1092) to pass through a third heat exchanger (87), and the third plurality of valves (1037*as*, 1037*ai*, 1037*bs*, 1037*bi*) allow for the temperature increase of the decompressed side of the second closed chamber (1034) until the temperature is higher than the temperature of the other side of the second closed chamber (1034) which was compressed in the prior step, through a fluid of the second heat transfer circuit (1093) which passes through a fourth heat exchanger (88), wherein the valves (1037*as*, 1037*ai*, 1037*bs*, 1037*bi*) are operated by the second control unit (1011);

decompressing the second thermal working fluid within the second closed chamber, from the side that was initially compressed, and compress the second thermal working fluid from the other second closed chamber through the activation of a second directional control valve (1029), without activating the valves (1037*as*, 1037*ai*, 1037*bs*, 1037*bi*), to once again provoke the change of state due to the low pressure and temperature, according to the phase diagram of each thermal working fluid;

repeating stages e) through g) until the desired temperature is reached in the third (87) and fourth (88) heat exchangers;

providing a pipe (97) in which first the second heat exchanger (42) is inserted, then the third (87), and the fourth (88); and extracting water from the air flow through condensation within the pipe (97), when precipitating the water in a water accumulator (95) that is below the third heat exchanger (87) in the same pipe (97).

14. A method for heating or cooling an environment, with low energy consumption, for domestic, commercial, or industrial use, wherein the method comprises the following steps:

a) inserting two thermal working fluids with different temperatures for changing states each into a closed chamber (34*a*, 34*b*, 2034*a*, 2034*b*) each connected to a respective force unit, wherein, those closed chambers (34*a*, 34*b*, 2034*a*, 2034*b*) comprise at least one tube (12, 2012) joined to at least one radiator (8*a*, 8*b*, 2008*a*, 2008*b*);

b) regulating the operation of the directional control valve (29, 2029) according to the temperature and pressure obtained in each closed chamber, through a control unit (11);

c) compressing the thermal working fluid according to the phase diagram of each thermal working fluid, to increase the temperature of that thermal working fluid within a side of the closed chamber (2034*a*, 2034*b*) to transfer heat to the second heat transfer circuit (93) through some valves (2037*as*, 2037*ai*, 2037*bs*, 2037*bi*) and decompress an opposite side (2034*a* or 2034*b*) of the closed chamber to cool the thermal working fluid, according to the phase diagram of each thermal working fluid to decrease the temperature of that fluid within that closed chamber (2034*a* or 2034*b*), to absorb heat from the auxiliary heat transfer circuit (C93*a* or C93*b*) that joins the closed chamber (2034*a* or 2034*b*) to some closed chambers (34*a*, 34*b*), which has the decompressed thermal working fluid absorbing heat with the closed chamber (34*a*, 34*b*) which has the compressed thermal working fluid surrendering heat;

d) decompressing the opposite side of the closed chamber (34*a*, 34*b*) that has compressed thermal working fluid to cool the thermal working fluid, according to the phase diagram of each thermal working fluid to decrease the temperature of that fluid within that closed chamber, to absorb heat from the first heat transfer circuit (92) through some valves (37*as*, 37*ai*, 37*bs*, 37*bi*) through at least one force unit (10);

e) producing the change of state of the thermal working fluids, from liquid to solid or vice versa or from a solid state to another solid state or vice versa, from the increase in pressure, according to the phase diagram of each thermal working fluid; and f) balancing the temperatures of both chambers (34*a*, 34*b*, 2034*a*, 2034*b*) through the recirculation of a heat transfer fluid which is guided by some valves (81*ai*, 81*bs*, 81*bi*; 81*as*) and (2081*ai*, 2081*bs*, 2081*bi*) operated by a control unit (11), while the thermal working fluid is kept compressed within those closed chambers (34*a*, 34*b*, 2034*a*, 2034*b*);

g) decreasing the temperature of the compressed side of the chamber (34*a* or 34*b*) through the valves (37*as*, 37*ai*, 37*bs*, 37*bi*) until said temperature is lower than the temperature of the opposite side of the chamber (34*a* or 34*b*) that was decompressed in the prior step, through the fluid of the first heat transfer circuit (92) that passes through a first heat exchanger (41), the valves (2037*as*, 2037*ai*, 2037*bs*, 2037*bi*) allow for the temperature increase of the decompressed side of the chamber (2034*a* or 2034*b*) until said temperature is higher than the temperature of the other side of the chamber (2034*a* or 2034*b*) which was compressed in the prior step, through a fluid of the second heat transfer circuit (93) which passes through a second heat exchanger (42), and the valves (37*as*, 37*ai*, 37*bs*, 37*bi*) and (2037*as*, 2037*ai*, 2037*bs*, 2037*bi*) allow for the temperature increase of the closed chamber (34*a* or 34*b*) which has decompressed fluid and decrease the temperature of the closed chamber (2034*a* or 2034*b*) which has compressed fluid through an auxiliary heat transfer circuit (C93*a* or C93*b*), wherein the valves (37*as*, 37*ai*, 37*bs*, 37*bi*) and (2037*as*, 2037*ai*, 2037*bs*, 2037*bi*) are operated by the control unit (11);

h) decompressing the thermal working fluids within those closed chambers (34*a*, 34*b*, 2034*a*, 2034*b*), from the side that was initially compressed, and compress the thermal working fluids within the other closed chambers through the activation of a directional control valve (29) or (2029), without activating the valves (37*as*, 37*ai*, 37*bs*, 37*bi*) nor the valves (2037*as*, 2037*ai*, 2037*bs*, 2037*bi*), to once again provoke the change of state due to the low pressure and temperature, according to the phase diagram of each thermal working fluid;

i) repeating stages f) through h) until the desired temperature is reached in the first (41) and second (42) heat exchangers.

15. The method according to claim 14, wherein: after repeating stages f) through h) until the desired temperature is reached in the first (41) and second (42) heat exchangers, the method also comprises:

activating a shut-off valve (67*a*), depending on the ambient temperature and humidity, to circulate the fluid of the first heat transfer circuit (92) through the chamber (2034*a*, 2034*b*), or activating the shut-off valve (67*b*) to circulate the fluid of the second heat transfer circuit (93) through the chamber (34*a*, 34*b*).

16. The method to extract water from the environment, according to claim 14, wherein the method comprises the following step:

providing a pipe (97) in which the first (41) and second (42) heat exchangers are inserted; and extracting water from the air flow through condensation within the pipe (97), when precipitating the water in a water accumulator (95) that is between the first heat exchanger (41) and the second (42) in the same pipe (97).

17. The method to extract water from the environment, according to claim 16, wherein the method comprises the following step:

recirculating the air from the pipe (97) through an air recirculation system (153) that comprises a fan (152) within an air pipe so the air enters and exits the pipe (97) through some diffusers (155), which are located downstream from the first heat exchanger (41).

18. The method to extract water from the environment, according with claim 16, wherein the method comprises the following step:

1. providing a temperature and humidity sensor (99), located in a proximal end of that pipe (97), to control the system to extract water from the environment through a control unit (11).

19. The method to extract water from the environment, according to claim 14, wherein the method also comprises the following parallel operation steps:

a) inserting two thermal working fluids with different temperatures for changing states each into a closed chamber (1034*a*, 1034*b*, 3034*a*, 3034*b*) each connected to a respective force unit, wherein, those closed chambers (1034*a*, 1034*b*, 3034*a*, 3034*b*) comprise at least one tube (1012, 3012) joined to at least one radiator (1008*a*, 1008*b*, 3008*a*, 3008*b*);

b) regulating the operation of the directional control valve (1029, 3029) according to the temperature and pressure obtained in each closed chamber, through a control unit (1011);

c) compressing the thermal working fluid according to the phase diagram of each thermal working fluid, to increase the temperature of that thermal working fluid within a side of the closed chamber (3034*a*, 3034*b*) to transfer heat to the second heat transfer circuit (1093) through some valves (3037*as*, 3037*ai*, 3037*bs*, 3037*bi*) an opposite side of the closed chamber (3034*a* or 3034*b*) to cool the thermal working fluid, according to the phase diagram of each thermal working fluid to decrease the temperature of that fluid within that closed chamber (3034*a* or 3034*b*), to absorb heat from the auxiliary heat transfer circuit (C1093*a* or C1093*b*) that joins the closed chamber (2034*a* or 2034*b*) to some closed chambers (1034*a*, 1034*b*), which has the decompressed thermal working fluid absorbing heat with the closed chamber (1034*a*, 1034*b*) which has the compressed thermal working fluid surrendering heat;

d) decompressing the opposite side of the closed chamber (1034*a*, 1034*b*) that has compressed thermal working fluid to cool the thermal working fluid, according to the phase diagram of each thermal working fluid to decrease the temperature of that fluid within that closed chamber, to absorb heat from the first heat transfer circuit (1092) through some valves (1037*as*, 1037*ai*, 1037*bs*, 1037*bi*) through at least one force unit (10);

e) producing the change of state of the thermal working fluids, from liquid to solid or vice versa or from a solid state to another solid state or vice versa, from the increase in pressure, according to the phase diagram of each thermal working fluid; and f) balancing the temperatures of both chambers (1034*a*, 1034*b*, 3034*a*, 3034*b*) through the recirculation of a heat transfer fluid which is guided by some valves (1081*ai*, 1081*bs*, 1081*bi*; 1081*as*) and (3081*ai*, 3081*bs*, 3081*bi*; 3081*as*) operated by a control unit (1011), while the thermal working fluid is kept compressed within those closed chambers (1034*a*, 1034*b*, 3034*a*, 3034*b*);

g) decreasing the temperature of the compressed side of the chamber (1034*a* or 1034*b*) through some valves (1037*as*, 1037*ai*, 1037*bs*, 1037*bi*) until said temperature is lower than the temperature of the opposite side of the chamber (1034*a* or 1034*b*) that was decompressed in the prior step, through the fluid of the first heat transfer circuit (1092) that passes through a fourth heat exchanger (88), the valves (3037*as*, 3037*ai*, 3037*bs*, 3037*bi*) allow for the temperature increase of the decompressed side of the chamber (3034*a* or 3034*b*) until said temperature is higher than the temperature of the other side of the chamber (3034*a* or 3034*b*) which was compressed in the prior step, through a fluid of the second heat transfer circuit (1093) which passes through a fourth heat exchanger (88), and the valves (37*as*, 37*ai*, 37*bs*, 37*bi*) and (2037*as*, 2037*ai*, 2037*bs*, 2037*bi*) allow for the temperature increase of the closed chamber (1034*a* or 1034*b*) which has decompressed fluid and decrease the temperature of the closed chamber (2034*a* or 2034*b*) which has compressed fluid through an auxiliary heat transfer circuit (C1093*a* or C1093*b*), wherein the valves (1037*as*, 1037*ai*, 1037*bs*, 1037*bi*) and (3037*as*, 3037*ai*, 3037*bs*, 3037*bi*) are operated by a control unit (1011);

h) decompressing the thermal working 1 fluid within those closed chambers (1034*a*, 1034*b*, 3034*a*, 3034*b*), from the side that was initially compressed, and compress the thermal working fluid within the other closed chambers through the activation of a directional control valve (1029) or (3029), without activating the valves (1037*as*, 1037*ai*, 1037*bs*, 1037*bi*) nor the valves (3037*as*, 3037*ai*, 3037*bs*, 3037*bi*), to once again provoke the change of state due to the low pressure and temperature, according to the phase diagram of each thermal working fluid;

i) providing a pipe (97) in which first the second heat exchanger (42) is inserted, then the third (87), and the fourth (88);

j) extracting water from the air flow through condensation within the pipe (97), when precipitating the water in a water accumulator (95) that is below the third heat exchanger (87) in the same pipe (97); and k) repeating stages f) through h) until the desired temperature is reached in the third (87) and fourth (88) heat exchangers.

20. The method to extract water from the environment, according to claim 19, wherein the method also comprises the following:

pumping accumulated water for use through a humidifier;

decreasing the temperature of the air that enters through the pipe (97).

* * * * *